United States Patent
Fernández Gutiérrez et al.

(10) Patent No.: US 8,671,433 B2
(45) Date of Patent: Mar. 11, 2014

(54) METHODS, APPARATUS AND SYSTEMS FOR DELIVERING AND RECEIVING DATA

(75) Inventors: Álvaro Fernández Gutiérrez, Barcelona (ES); Tim L. Kitchen, San Francisco, CA (US)

(73) Assignee: Media Patents, S.L. (ES)

( * ) Notice: Subject to any disclaimer, the term of this patent is extended or adjusted under 35 U.S.C. 154(b) by 67 days.

(21) Appl. No.: 13/169,000

(22) Filed: Jun. 26, 2011

(65) Prior Publication Data

US 2012/0131610 A1    May 24, 2012

Related U.S. Application Data

(63) Continuation-in-part of application No. 13/083,395, filed on Apr. 8, 2011, which is a continuation-in-part of application No. 12/950,877, filed on Nov. 19, 2010.

(51) Int. Cl.
*H04N 7/173* (2011.01)

(52) U.S. Cl.
USPC .......................................... 725/105

(58) Field of Classification Search
None
See application file for complete search history.

(56) References Cited

U.S. PATENT DOCUMENTS

| | | | | |
|---|---|---|---|---|
| 7,039,932 B2 * | 5/2006 | Eldering | ........................ | 725/35 |
| 7,417,568 B2 | 8/2008 | Fallon et al. | | |
| 7,496,947 B1 | 2/2009 | Meyers | | |
| 7,669,123 B2 | 2/2010 | Zuckerberg et al. | | |
| 2003/0139966 A1 | 7/2003 | Sirota et al. | | |
| 2003/0149975 A1 | 8/2003 | Eldering et al. | | |
| 2004/0261099 A1 * | 12/2004 | Durden et al. | ................... | 725/32 |
| 2008/0086570 A1 | 4/2008 | Dey et al. | | |
| 2008/0134053 A1 | 6/2008 | Fischer | | |
| 2008/0294607 A1 * | 11/2008 | Partovi et al. | ..................... | 707/3 |
| 2009/0187936 A1 | 7/2009 | Parekh et al. | | |
| 2009/0199230 A1 | 8/2009 | Kumar et al. | | |
| 2009/0276802 A1 | 11/2009 | Amento et al. | | |
| 2009/0293079 A1 | 11/2009 | McKee et al. | | |
| 2010/0138852 A1 | 6/2010 | Hirsch et al. | | |
| 2010/0235236 A1 * | 9/2010 | Halevi et al. | ............... | 705/14.49 |
| 2011/0113086 A1 | 5/2011 | Long et al. | | |
| 2012/0047529 A1 * | 2/2012 | Schultz et al. | ................... | 725/34 |

OTHER PUBLICATIONS

Schulzrine H. et al., Internet Engineering Task Force, Network Working Group, Request for Comments 2326, Apr. 1998; currently available at Internet address http://www.ietf.org/rfc/rfc2326.txt.
M. Handley et al., Request for Comments 4566, Network Working Group, Jul. 2006, currently available at Internet address http://www.ietf.org/rfc/rfc4566.txt.
H. Schultzrinne et al., Request For Comment 3550, Network Working Group, Jul. 2003, currently available at Internet address http://www.ietf.org/rfc/rfc3550.txt.

* cited by examiner

*Primary Examiner* — Brian Pendleton
*Assistant Examiner* — Olugbenga Idowu
(74) *Attorney, Agent, or Firm* — Cantor Colburn LLP

(57) ABSTRACT

According to one implementation a method is provided that involves transmitting from a social network site to a television broadcasting site a stream of data for being broadcast to multiple end-user media devices and also transmitting via a unicast communication from the social network site non-broadcast content for the purposes of being incorporated, integrated or otherwise played in conjunction with the broadcast content in the end-user media devices.

15 Claims, 22 Drawing Sheets

METHODS, APPARATUS AND SYSTEMS FOR DELIVERING AND RECEIVING DATA

CROSS-REFERENCE TO RELATED APPLICATIONS

This application is a continuation-in-part of and claims the benefit and priority to U.S. patent application Ser. No. 13/083,395 filed Apr. 8, 2011, which is a continuation-in-part to U.S. patent application Ser. No. 12/950,877 filed Nov. 19, 2010

TECHNICAL FIELD

The inventions relate to methods, apparatus and systems for delivering and receiving data.

BACKGROUND

There are a number of television broadcast standards used around the world which are not compatible with one another. For example, Europe uses "Digital Video Broadcasting" (DVB) standards, while North America uses "Advanced Television Systems Committee" (ATSC). Furthermore, Japan uses "integrated Services Digital Broadcasting" (ISDB) while China uses its homegrown "Digital Multimedia Broadcast Terrestrial/Handheld" (DMB-TH) standard. In addition there are cable, satellite, handheld and terrestrial TV standards.

Television is facing competition from the internet one at least two fronts. For example users can buy or rent TV series and films on a number of websites and watch them without advertisements. Users may also download the content from sites like Hulu.com using streaming technology to receive the content with advertisements. Other subscription based businesses are being developed to allow users to access the content, for example, in exchange for a monthly payment. A second front of competition with the internet is that of time. For example, many people spend time using applications like social networks, search engines, instant messaging, e-mails, voice-over IP, games, etc. As the users spend more time on the internet they spend less time watching television.

Different standards have been developed for digital television. For example, the MPEG-2 standard defined by the Motion Picture Expert Group (MPEG) is a standard that allows television to convert their analog systems into more efficient digital television systems. There are other MPEG industry standards. For example MPEG4 offers a more efficient video compression. A Standard Definition (SD) television requires approximately 3.8 Mbps in MPEG-2 and 1.8 Mbps in MPEG-4. A High Definition (HD) television requires approximately 19 Mbps in MPEG-2 and around 7 Mbps in MPEG-4.

The MPEG-2 standard specifies formatting for the various component parts of a multimedia program. Such a program might include, for example, MPEG-2 compressed video, compressed audio, control data and/or user data. The standard also defines how these component parts are combined into a single bit stream. The process of combining the components into a single stream is known as multiplexing. The multiplexed stream may be transmitted over any of a variety of links, such as Radio Frequency Links (UHF/VHF), Digital Broadcast Satellite Links, Cable TV Networks, Standard Terrestrial Communication Links, Microwave Line of Sight (LoS) Links (wireless), Digital Subscriber Links (ADSL family), Packet/Cell Links (ATM, IP, IPv6, Ethernet.)

To compress a stream carrying multimedia entertainment content, discrete samples in a stream are transformed into a bit-stream of tokens, which uses less bandwidth than the corresponding initial stream, since essentially only data that has changed from image to image is captured in the compressed stream, instead of capturing all the information from each image. The signal is broken into convenient sized data blocks (frames, or packets), and header information is added to each data block. The header typically identifies the start of the packets and may include time-stamps. The multimedia encoding/decoding format tells the decoder (receiver) how to inverse-represent the compacted stream back into data resembling the original stream of un-transformed data, so that the data may be heard and viewed in its normal form.

MPEG systems are composed of various types of streams, such as, for example, Elementary Streams (ES), Packet Elementary Streams (PES), Program Streams (PS) and Transport Streams (TS). Elementary Streams (ES) contain the raw information components stream of a program stream, for example the compressed information of an audio stream of a program or the compressed information of a video stream of a program. Elementary streams in MPEG are first packetized in variable-length packets called PES packets which primarily have a length of 64 kbytes and begin with a PES header of 6 bytes minimum length. A Packet Elementary Stream (PES) is a raw information component stream that has been converted to packet form, such as, for example, a sequence of packets. This packetization process involves dividing a group of bits in an elementary stream and adding packet header information to the data. The packet header includes a Packet Identification code (PID) that uniquely identifies the packetized elementary stream from all other packetized elementary streams that may be transmitted. This Packetized Elementary Stream (PES) with its relatively long packets structures is not optimal for broadcasting transmission.

The MPEG-2 standard defines two forms of multiplexing (combining of ES into a single stream): MPEG Program Streams (PS) and MPEG Transport Streams (TS).

A MPEG Program Stream contains a group of tightly coupled PES packets referenced to a common time base like, for example, a television program. Such streams are suited for transmission in a relatively error-free environment and enable easy software processing of the received data.

In MPEG Transport Streams, each PES packet is broken into fixed-sized transport packets, providing the basis of a general-purpose technique for combining one or more streams, possibly with independent time bases. This is suited for transmission in which there may be potential packet loss or corruption by noise, and/or where there is a need to send more than one program at a time. In MPEG-2, the objective has been to assemble up to 20 independent TV or radio programs to form one common multiplexed MPEG-2 data signal.

The MPEG Transport Stream consists of a sequence of fixed sized transport packets of 188 bytes. Each packet comprises 184 bytes of payload and a 4 byte header. One of the items in this 4 byte header is the 13 bit Packet Identifier (PID).

MPEG-2 Transport stream (TS) is a standard format for transmission and storage of audio, video, and data, and is used in broadcast systems such as DVB and ATSC. Transport Stream is specified in MPEG-2 Part 1, Systems (formally known as ISO/IEC standard 13818-1 or ITU-T Rec. H.222.0).

The first header byte of a TS packet is the "sync byte," whose value is 0x47, followed by three one-bit flags and a 13-bit Packet Identifier (PID). This is followed by a 4-bit continuity counter. Additional optional transport fields, as signaled in the optional adaptation field, may follow. The rest of the packet typically consists of payload. Packets are 188 bytes in length, but the communication medium may add some error correction bytes to the packet. ISDB-T and DVB-T/C/S uses 204 bytes and ATSC 8-VSB, 208 bytes as the size of emission packets (transport stream packet+FEC data). ATSC transmission adds 20 bytes of Reed-Solomon forward error correction to create a packet that is 208 bytes long. The 188-byte packet size was originally chosen for compatibility with ATM systems.

A Transport Stream specifies a container format encapsulating packetized Elementary Streams, with error correction and stream synchronization features for maintaining transmission integrity when the signal is degraded. Transport Stream transmissions may carry multiple Program Streams.

An Elementary Stream in a Transport Stream is identified by a 13-bit packet identifier called PID. A demultiplexer extracts Elementary Streams from the Transport Stream in part by looking for packets identified by the same PID. Packets in the same Elementary Stream have the same PID, so that the decoder can select the Elementary Streams it wants and reject the remainder. Currently, the elementary video, audio and data streams for the same channel use a different PID.

A Transport Stream may include Electronic Program Guide (EPG) information and Program Specific Information (PSI), which describe the Elementary Streams which need to be combined to build programs.

Broadcast systems, like for example DVB, do not only transmit pure content, but also descriptions about the content in the form of metadata. This metadata contains different kind of content-information and may be use to navigate through the content, for example to select different television channels. For example, in MPEG-2 the metadata may be transmitted using the Program Specific Information (PSI) packets.

As discussed above, Program Specific Information is the MPEG-2 data that identifies what parts of the transport stream belong to a particular program. This information is carried in a number of PSI tables:

Program Association Table (PAT)
Program Map Table (PMT)
Conditional Access Table (CAT)
Network Information Table (NIT)

FIG. 1 is a diagram showing DVB MPEG-2 elementary streams, including audio streams, video streams, data streams and the associated Program Map Tables (PMT) and Program Association Table (PAT).

The Program Association Table (PAT) is the entry point for the Program Specific Information (PSI) tables. It lists all programs available in the transport stream. It is carried in packets with PID=0. For each assigned program number, the PAT lists the PID for packets containing that program's PMT.

The PAT includes data that the decoder uses to determine which programs (also referred to as channels) exist in the respective transport stream. Each of the listed programs is defined by a 16-bit value called program number. Each of the programs listed in PAT has an associated value of PID for its Program Map Table (PMT). The PAT points to a number of PMTs (one per program), which, in turn points to the video, audio, and data content of a respective program carried by the stream.

Program Map Tables (PMTs) contain information about programs. The Program Map Table (PMT) lists all the PIDs for packets containing elements of a particular program (for example, audio, video, and auxiliary data). For each program, there is one PMT. Once the PIDs for the video, audio and data content of the respective program carried by the stream are known, the decoder is able to decode the packets that have these PIDs.

While the MPEG-2 standard permits more than one PMT section to be transmitted with a single PID, most MPEG-2 television systems such as ATSC and SCTE require each PMT to be transmitted with a separate PID that is not used for any other packets. The PMTs provide information on each program present in the transport stream, including the program number, and list the elementary streams that comprise the described MPEG-2 program. There are also locations for optional descriptors that describe the entire MPEG-2 program, as well as an optional descriptor for each elementary stream. Each elementary stream is labelled with a stream type value.

The MPEG transport decoder generally performs the following functions:
1. read the PAT to find the PMT for a desired program,
2. demultiplex the packets that carry the desired PMT
3. read the PMT
4. demultiplex the packets (with PIDs specified in the PMT) into the various elemental streams The MPEG-2 specification does not specify the format of the CAT and NIT.

A CAT is used for a scrambled stream. The CAT is carried in packets with PID=1. The CAT contains PIDs for Entitlement Management Messages (EMMs), which contain authorization level information for conditional access systems.

To cope with any extensions, the MPEG Group has created the possibility to incorporate so-called "private sections and private tables" in the transport stream. The group has defined mechanisms which specify what a section of a table has to look like, what its structure has to be and by what rules it is to be linked into the transport stream. Taking advantage of the "private section" and "private tables" features, the European DVB Group has introduced numerous additional tables intended to simplify the operation of DVB receivers. Called "Service Information" (SI) they are defined in ETSI Standard ETS300468. Some of these tables are the "Network Information Table", the "Time&Date Table" (TDT), and the "Time Offset Table" (TOT).

The Network Information Table (NIT) is an optional table that describes all physical parameters of a DVB transmission channel. It contains, for example, the received frequency and the type of transmission (e.g. satellite, cable, terrestrial) and also the technical data of transmission like error protection, type of modulation, etc. This table may be used to optimize the channel scan as much as possible. FIG. 1 shows an example of a Program Association Table (PAT) containing the PID for a Network Information Table (NIT).

In Europe, many broadcasters are also transmitting an "Electronic Program Guide" (EPG) which has its own table in DVB, the so-called "Event Information Table" (EIT). It contains the planned starting and stopping times for the broadcasts of, e.g. one day or one week. The structure which is possible here is very flexible and also allows additional information to be transmitted.

The "Time&Date Table" (TDT) is used to transmit the current clock time and the current date. In the TDT, Greenwich Mean Time (GMT), i.e. the current clock time for the Zero-Degree meridian without any daylight saving time shift is transmitted. The respective applicable time offset can then be broadcast in a "Time Offset Table" (TOT) for the various time zones. It depends on the software of the TV receiver how the information contained in the TDT and TOT is evaluated. Complete support for this broadcast time information may require the DVB receiver to be informed of its current location in a country having a number of time zones.

SUMMARY OF THE DISCLOSURE

According to one implementation a method is provided that comprises transmitting from a social network site to a television broadcasting site a stream of data comprising broadcast content, the broadcast content designated by the social network site to be broadcast by the television broadcasting site to a plurality of end-user media devices, the end-users being members of the social network site; receiving in the social network site from an end-user media device that is receiving or designated to receive the broadcast content broadcast data related to the broadcast content and identifying data of the member end-user; accessing in the social network site member information of the end-user; and selecting in the social network site by use of the broadcast data and the member information targeted advertising content for the purpose of facilitating a transmission of the targeted advertising content to the end-user media device for it to be played in conjunction with the broadcast content.

Methods, apparatus and systems are provided that enable a user of a computing device to alter, augment or replace broadcast transmitted content destined for or received in the computing device with on-line content from the internet. In some implementations an application program, purchasable or otherwise downloadable from the internet (e.g., from an application store), facilitates in the computing device the manipulation of broadcast transmitted content that changes the manner in which the content from a broadcast transmission source (e.g., television or cable transmission sources) is presented by the computing device absent the intervention of the application program. For example, in one implementation an application program downloaded from the internet to the computing device alters the presentation of broadcast transmitted content by substituting broadcast advertising with non-advertising content from the internet. Many other examples of manipulating or enabling broadcast transmitted content in a computing device by the use of one or more application programs received in the computing device on-line the internet are disclosed and contemplated herein.

For example, in one implementation a method is implemented in a user computing device having a pre-existing capability to receive first content in the form of at least one first data signal from a first external source and to process the at least one first data signal to produce an intended first video presentation and an intended first audio presentation of all or part of the first content in a video display device and in an audio device, respectively, the video display device and audio device integrated with or otherwise connected with the user computing device, the method comprising: receiving on-line from a first site different than the first external source an application program in the user computing device, the application program comprising executable instructions that when executed in the computing device are capable of intervening in the pre-existing first data signal process at a time coincident or after the first content is received in the user computing device, receiving in the user computing device the first content from the first external source; and altering the pre-existing first data signal process in the user computing device by use of the application program to produce a second video presentation and/or a second audio presentation different than one or both of the respective first video presentation and first audio presentation.

According to one implementation a method is provided comprising: receiving in a social network site from a computing device of a member of the social network site identifying data of the member; receiving in the social network site from the computing device broadcast data related to broadcast content being played in the computing device; accessing in the social network site member information; and selecting in the social network site by use of the broadcast data and member information targeted advertising content for the purpose of facilitating a transmission of the targeted advertising content to the computing device for it to be played in conjunction with the broadcast content. In one implementation the method further comprises transmitting from the social network site the targeted advertising content to the computing device.

According to one implementation a method is provided comprising: transmitting from a social network site an application program to at least first, second and third computing devices, the application program comprising executable instructions that when executed in the first, second and third computing devices cause an exchange of data between the respective first, second and third computing devices with the social network site; receiving in the social network site from the first, second and third computing devices data related to a particular broadcast being displayed on first, second and third video displays associated with the first, second and third computing devices, respectively; the social network site determining that a social relationship exists between users of the first and second computing devices; after determining that a social relationship exists between the users of the first and second computing devices, the social network site transmitting first user information about the user of the first computing device to the second computing device in a format useable by the application program to cause a superimposition of the first user information on the first video display of the computing device concurrent with the display of the particular broadcast; and after determining that a social relationship exists between the users of the first and second computing devices, the social network site transmitting second user information about the user of the second computing device to the first computing device in a format useable by the application program to cause a superimposition of the second user information on the first video display of the computing device concurrent with the display of the particular broadcast.

According to one implementation a method is provided comprising: transmitting from a social network site an application program to a plurality of computing devices, the application program comprising executable instructions that when executed in the plurality of computing devices cause an exchange of data between the respective plurality of computing devices and the social network site; receiving in the social network site from a subset of the plurality of computing devices logged-in with the social network site data related to a particular broadcast being displayed on respective video displays of the subset of the plurality of computing devices; and the social network site transmitting aggregated data related to the particular broadcast to the subset of the plurality of computing devices in a format useable by the application program to superimpose the aggregated data on the video displays of the subset of the plurality of computing device concurrent with the particular broadcast.

According to one implementation a method is provided comprising: transmitting from a social network site an application program to at least first, second and third computing devices, the application program comprising executable instructions that when executed in the first, second and third computing devices cause an exchange of data between the respective first, second and third computing devices with the social network site; receiving in the social network site from the first, second and third computing devices data related to a particular broadcast being displayed on first, second and third video displays associated with the first, second and third computing devices, respectively; receiving in the social network site a text communication about the particular broadcast from one of the users of the first, second and third computing devices; and the social network site transmitting at least a portion of the text communication to the computing devices of the other users in a format useable by the application program to cause a superimposition of the text on the video displays of the other computing device concurrent with the display of the particular broadcast.

According to one implementation a method is provided comprising: a social network site transmitting on-line via the internet to a software developer site data specific to the social network site to be incorporated into an application program; receiving in the social network site the application program incorporating the data specific to the social network site; transmitting from the social network site the application program to at least first, second and third computing devices, the application program comprising executable instructions that when executed in the first, second and third computing devices cause an exchange of data between the respective first, second and third computing devices with the social network site; receiving in the social network site from the first, second and third computing devices data related to a particular broadcast being displayed on first, second and third video displays associated with the first, second and third computing devices, respectively; the social network site determining that a social relationship exists between users of the first and second computing devices; after determining that a social relationship exists between the users of the first and second computing devices, the social network site transmitting first user information about the user of the first computing device to the second computing device in a format useable by the application program to cause a superimposition of the first user information on the first video display of the computing device concurrent with the display of the particular broadcast; and after determining that a social relationship exists between the users of the first and second computing devices, the social network site transmitting second user information about the user of the second computing device to the first computing device in a format useable by the application program to cause a superimposition of the second user information on the first video display of the computing device concurrent with the display of the particular broadcast.

BRIEF DESCRIPTION OF THE DRAWINGS

Other advantages and features of the present invention can be seen in the following description in which, with a non-limiting character, preferred embodiments are referred to in relation to the attached drawings.

DETAILED DESCRIPTION

By way of illustration and for exemplary purposes only, figures are provided to aid in the description of the various implementations disclosed herein. It is to be understood that the implementations illustrated and described herein, represent several of many ways to implement the inventions disclosed herein.

Figure 2A:
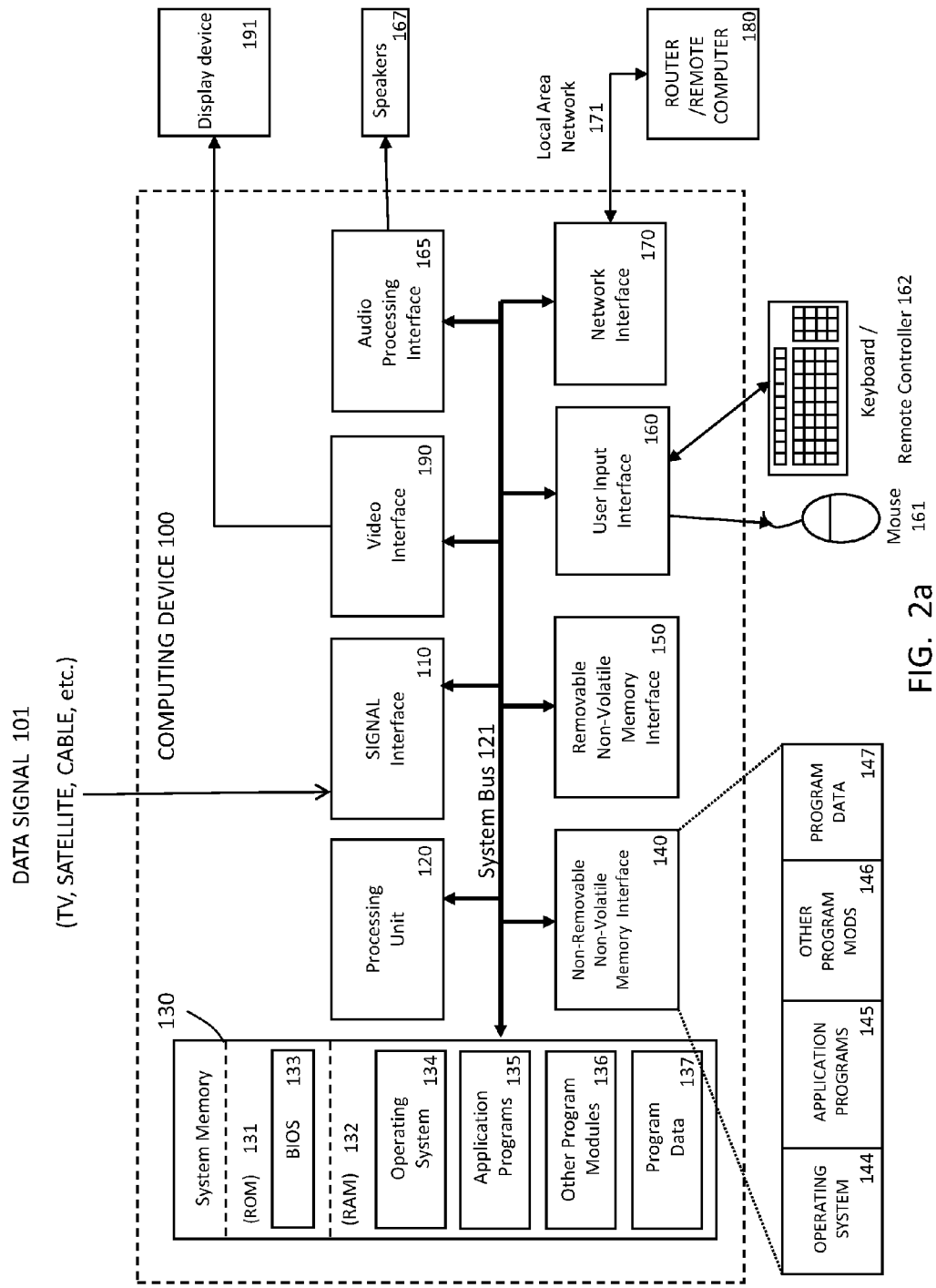
FIG. 2 illustrates an exemplary computing device.

FIG. 2a is a block diagram of an exemplary environment in which aspects of the inventions may be implemented. The environment is only one example of a suitable computing environment and is not intended to suggest any limitation as to the scope of use or functionality. Neither should the computing environment be interpreted as having any dependency or requirement relating to any one or combination of components illustrated in the exemplary operating environment. Numerous other general purpose or special purpose computing system environments or configurations are contemplated. Examples of well known computing systems, environments, and/or configurations that may be suitable for use with the invention include, but are not limited to, personal computers, hand-held or laptop devices, mobile phones, multiprocessor systems, microprocessor-based systems, set top boxes, televisions, programmable consumer electronics, network PCs, minicomputers, mainframe computers, distributed computing environments that include any of the above systems or devices, and the like.

With continued reference to FIG. 2a, the exemplary system includes a computing device 100 in the form of a computer system. Components of computing device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computing device 100 typically includes a variety of computer readable media. Computer readable media can be any available media that can be accessed by computer device and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as read only memory (ROM) 131 and random access memory (RAM) 132. A basic input/output system 133 (BIOS), containing the basic routines that help to transfer information between elements within computer device 100, such as during start-up, is typically stored in ROM 131. RAM 132 typically contains data and/or program modules that are immediately accessible to and/or presently being operated on by processing unit 120. By way of example, and not limitation, FIG. 2a illustrates operating system 134, application programs 135, other program modules 136, and program data 137.

The computing device 100 may also include other removable/non-removable, volatile/non-volatile computer storage media. By way of example only, FIG. 2a illustrates a hard disk drive 140 that reads from or writes to non-removable, non-volatile magnetic media and a drive 150 that reads from or writes to a removable, non-volatile media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 140 is typically connected to the system bus 121, and a removable memory interface, such as interface 150 may be also connected to the bus 121.

The drives and their associated computer storage media discussed above and illustrated in FIG. 2a, provide storage of computer readable instructions, data structures, program modules and other data for the computer device 100. In FIG. 2a, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. The application programs or other program modules of the computer device 100 can contain, among other things, computer instructions which, when executed cause the computer system to operate or perform functions.

A user may enter commands and information into the computer through input devices such as a keyboard 162 and pointing device 161, commonly referred to as a mouse, trackball or touch pad. Other input devices (not shown) may include a microphone, joystick, game pad, satellite dish, scanner, touch screens, multi-touch screens or the like. Some input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 167 and printer, which may be connected through an output peripheral interface.

The computer device 100 may operate in a networked environment using logical connections to one or more remote computing devices 180. The remote computing device(s) 180 may be a personal computer, a server, a router, a network PC, a peer device or other common network node, and typically includes a portion or all of the elements described above relative to the computer device 100. The logical connections depicted in FIG. 2a include a local area network (LAN) 171, but may also include other networks. Such networking environments are commonplace in offices, enterprise-wide computer networks, intranets and the Internet.

The network interface 170 provides an interface to outside networks, which may comprise many interconnected computer systems/devices and communication links as explained above. These communication links may be wire line links, optical links, wireless links or any other mechanism for communication of information. In an embodiment of the present invention, network 171 supports an Ethernet protocol with the network interface being connected to a LAN networking environment. The network interface 170 may take any of a variety of forms including that of a network card that is installed inside the computing device 100 or an embedded component or chip that is a part of the computing device 100, or it may be a part of another component, like for example a computer motherboard or an expansion card. In one embodiment of the present invention, as will be described in more detail below, the network interface is implemented as part of a chipset of the computing device 100.

In the example of FIG. 2a, the data signal 101 may come from any of a variety of signal sources. The signals may be any one of a variety of different analog and digital signals, whether broadcast, multicast, point-to-point, etc. Examples include NTSC signals, ATSC (Advanced Television Systems Committee) signals, PAL (Phase Alternating Line) signals, DVB ((Digital Video Broadcasting), cable television signals under a variety of possible standards, DBS (Direct Broadcast Satellite) signals, or any other type of television or video signal.

A great variety of different connectors may be used for the input and output signals. Some connector formats include coaxial cable, RCA composite video, S-Video, component video, DIN (Deutsche Industrie Norm) connectors, DVI (digital video interface), HDMI (High Definition Multimedia Interface), VGA (Video Graphics Adapter), USB (Universal Serial Bus) and IEEE (Institute of Electrical and Electronics Engineers) 1394. There are also several different proprietary connectors which may be preferred for particular applications. The types of connectors may be modified to suit a particular application or as different connectors become adopted.

In some implementations the computing device 100 is a stand-alone device, for example a box that can be placed on, or at least near, a television, that is similar to conventional devices for receiving cable programs. The computing device 100 could alternatively be performed by hardware resident elsewhere, such as within a television or display device 191, or by any suitably equipped terminal device like, for example, personal computers, mobile phones, smartphones, tablet computers like Apple iPAD and Android based tablets.

Figure 2B:
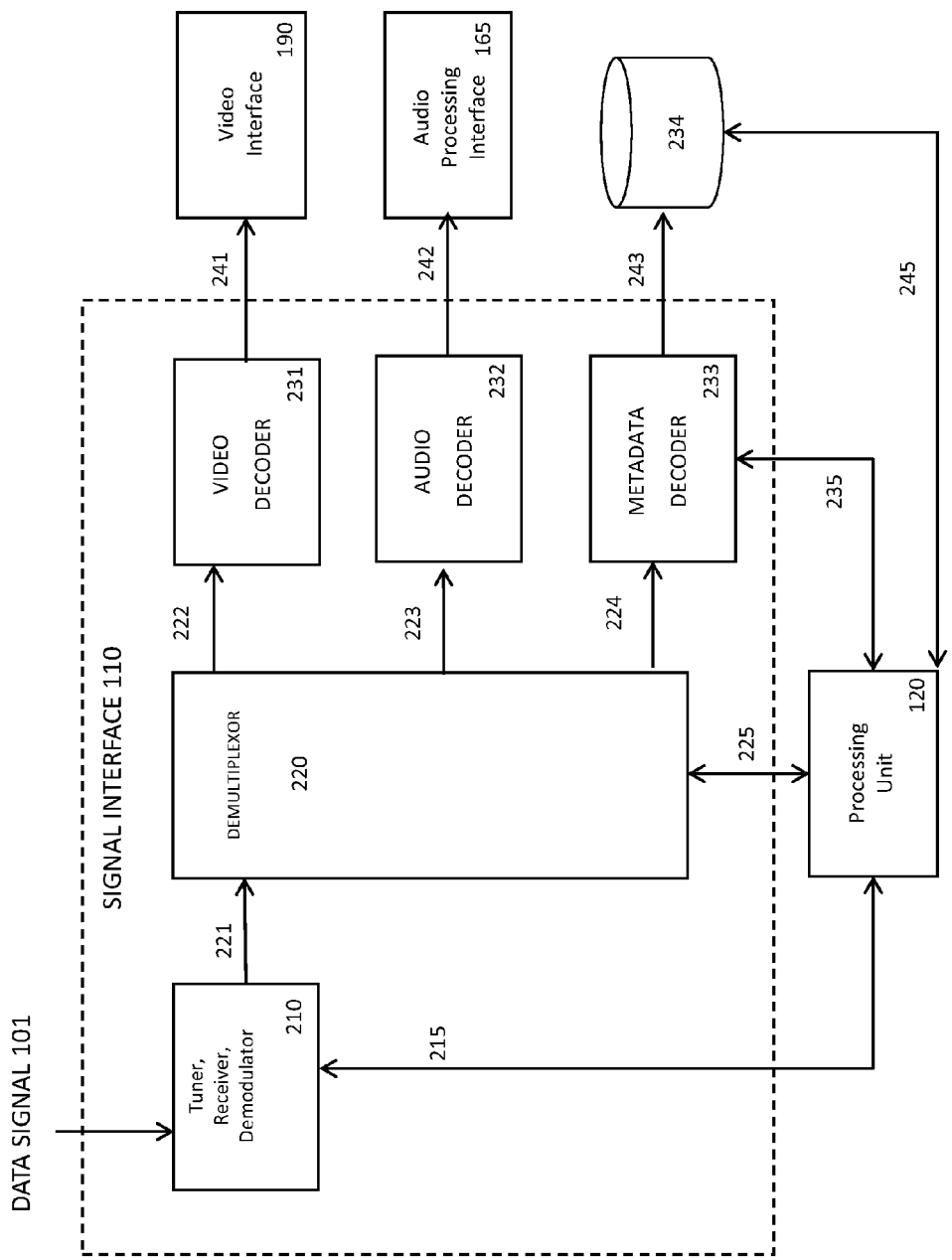

FIG. 2b shows an implementation of a signal interface module 110. In the example illustrated in FIG. 2b, the signal interface 110 comprises a tuner, receiver, demodulator (TRD) 210, demultiplexor 220, video decoder 231, audio decoder 232, and metadata decoder 233. A processing unit 120 may be connected to elements 210, 220 and 233 by means of the connections 215, 225 and 235 using any of a variety of connection types, including, for example, point to point connections, a bus, etc. In some implementations, the processing unit 120 may also be connected to video decoder 231 and audio decoder 232. For the purpose of simplicity, these connections are not shown in FIG. 2b.

In some implementations, some or all of the decoders are implemented in hardware. For example, a hardware video decoder can be a programmed semiconductor chip and/or a hard-coded semiconductor chip, like for example a microcontroller, a microprocessor, a digital signal processor, a Field Programmable Gate Array or an ASIC. In some implementations the decoders are capable of detecting MPEG-2, H.264, MPEG-4 or other multimedia data formats to recover video, audio, and/or multimedia information or metadata.

In some implementations processing unit 120 executes instructions stored in memory. The instructions stored in memory, when executed by processing unit 120 perform various functions such as controlling the various elements of the signal interface 110. For example, in one implementation, the demultiplexor 220, under the control of the processing unit 120, selects which of the channels received in TRD 210 will be transmitted to the decoders 231, 232, 233.

In some implementations TRD 210 receives signals from a multicast or broadcast media transmission. For example, TRD 210 may receive signals of a frequency band to which it is tuned and demodulates the signals to remove content signals from a carrier signal. Demodulated content signals are then supplied by tuner, receiver, and demodulator 210 to demultiplexor 220

In some implementations demultiplexor 220 receives the demodulated content signals from tuner, receiver, and demodulator 210 and separates the content into multiple data streams representing various channels and then the demultiplexor 220 selects one of the channels. The content of the selected channel are then supplied as an input to decoders 231, 232, 233.

In some implementations video decoder 231 receives the video data stream from demultiplexor 220 and decodes or decompresses the data streams using an appropriate algorithm. For example, the decoder 231 may receive a compressed video signal using a MPEG-2 data stream, and video decoder 231 will decode the MPEG-2 data stream to form a standard video signal. In one implementation, the video signal from decoder 231 is then supplied to the video interface 190 using the communication 241.

In some implementations audio decoder 232 receives the audio data stream from demultiplexor and decodes or decompresses the audio using an appropriate algorithm. In some implementations the audio decoder transmits the audio content to the audio processing interface 165 using the communication 242.

In some implementations the metadata decoder 233 receives metadata from demultiplexor and stores it in memory 234 using the communication 243. In some implementations, memory 234 may be one or more of RAM 132, non-removable memory 140 or removable memory 150. In one implementation the processing unit 120 accesses the metadata stored in memory 234 using the communication 245.

Figure 3:
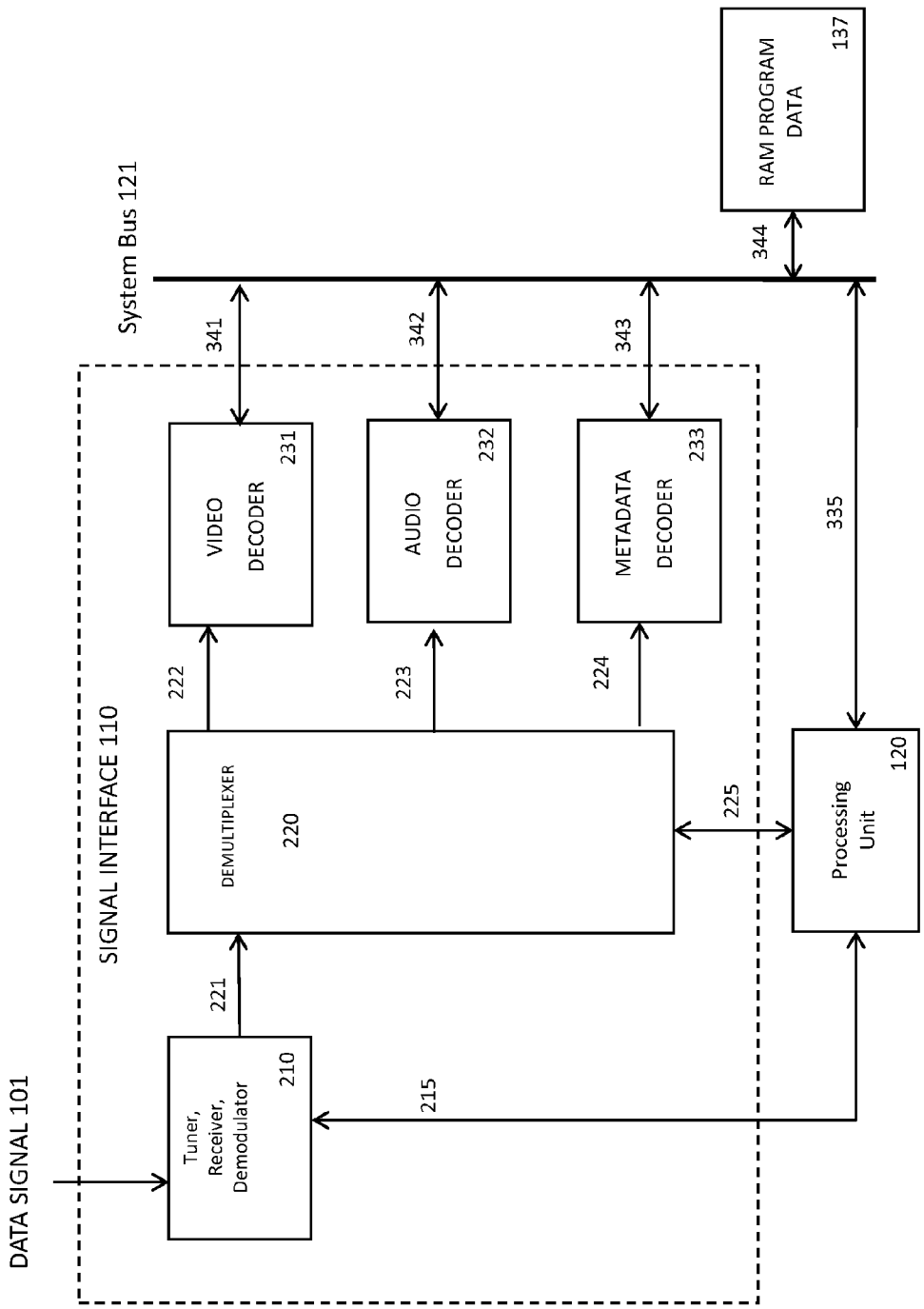
FIG. 3 illustrates a system according to one or multiple implementations.

FIG. 3 shows another implementation of a signal interface module 110. In the example illustrated in FIG. 3, the outputs of the video decoder 231, the audio decoder 232 and the metadata decider 233 are digital data transmitted to a system bus 121. The decoders 231, 232 and 233 are connected to the system bus 121 using the communications 341, 342 and 343, respectively. The processing unit 120 and the RAM 137 are also connected to the system bus 121 using the connections 335 and 344, respectively. In one implementation the decoders 231, 232 and 233 transmit the output data directly to the processing unit 120, for example using a software or hardware interrupt.

In some implementations the decoders 231, 232 and 233 store the output data in the RAM 137 and the processing unit 120 accesses the data stored in RAM 137 via the decoders. In one implementation the decoders use a direct memory access (DMA) system to store data in RAM 137.

Figure 4:
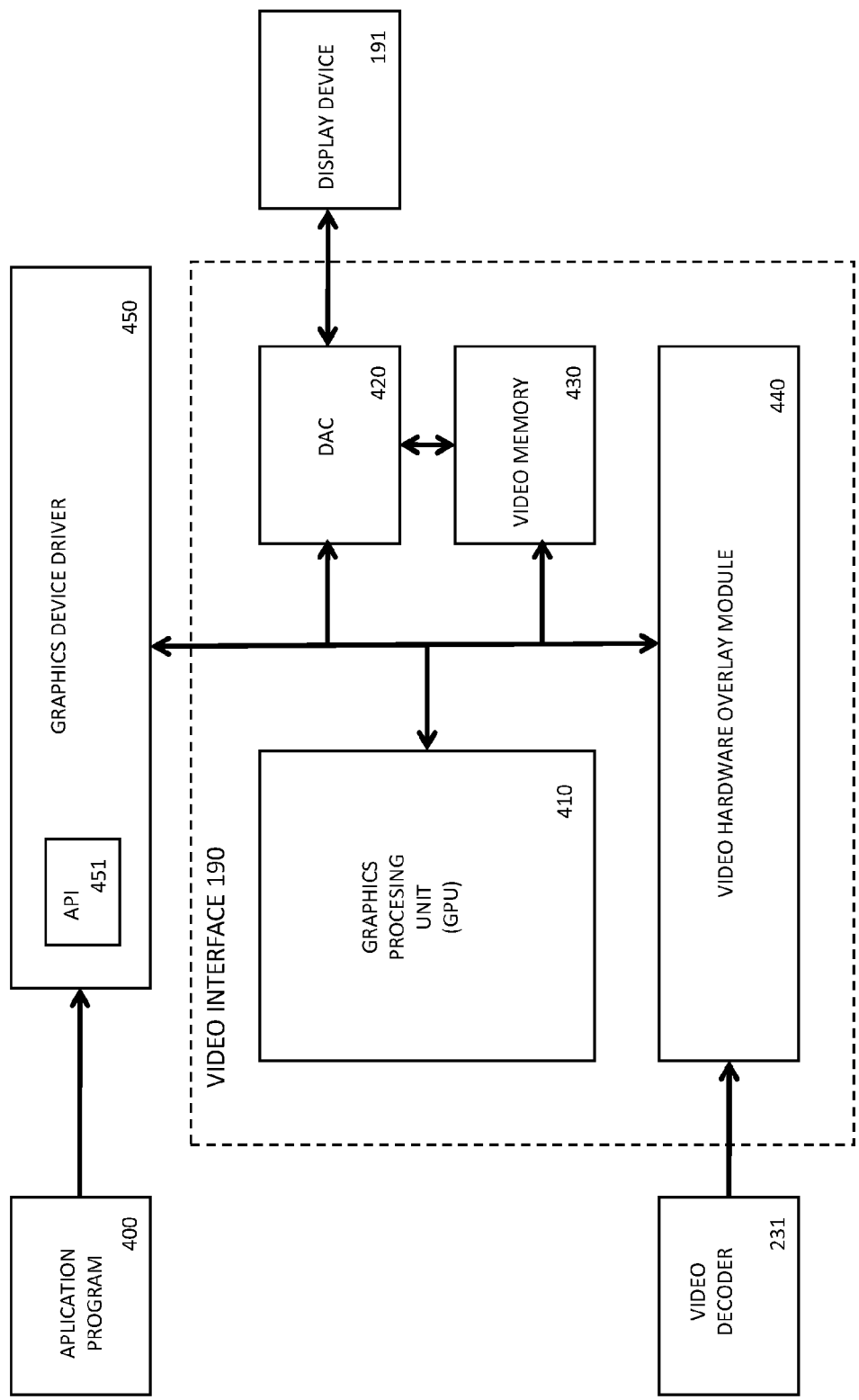
FIG. 4 illustrates a system according to one or multiple implementations.

FIG. 4 shows an implementation of a video interface 190. In the example illustrated in FIG. 4, the video interface comprises a graphic processing unit (GPU) 410 which is configurable to perform processing of the video data, a video memory 430, a digital to analog converter (DAC) 420 and a video hardware overlay module 440. In some implementations, when the video memory 430 is read, the resulting data may be then provided to a digital-to-analog converter (DAC) 420 which outputs a corresponding analog video signal suitable for display by an analog display device. In some implementations, the display device may be configured to process the digital data without the need of a digital-to-analog converter.

In some implementations, the video interface 190 cooperates with a software graphics device driver 450, which may include an application programming interface (API) 451 that provides an interface between the video interface 190 and an application program 400.

In a graphical user interface (GUI) operating system, one display device can typically display multiple applications and video signals simultaneously.

Without a hardware overlay, when an application draws to the screen, the operating system's graphical system constantly checks to ensure that the objects being drawn appear on the appropriate location on the screen, and that they don't collide with overlapping and neighboring windows. The graphical system must clip objects while they are being drawn when a collision occurs. This constant checking and clipping ensures that different applications can cooperate with one another in sharing a display, but also consumes a significant proportion of computing power.

A computing device typically draws on its display by writing a bitmapped representation of the graphics into the video memory 430. Without any hardware overlays, only one chunk of video memory exists, which all applications share, and the location of a given application's video memory moves whenever the user changes the position of the application's window. With shared video memory, an application must constantly check that it is only writing to memory that belongs to that application.

An application or a video signal using a hardware overlay gets a separate section of video memory that belongs only to that application or signal. Because nothing else uses it, the computing device never needs to waste resources in checking whether a given piece of the video memory belongs to it, nor does it need to monitor whether the user moves the window and changes the location of the video memory. To get the image from the separate video memory to display in tandem with the remaining shared elements on the display, the graphical system associates a certain attribute (for example, a particular color) as a "mask" for that overlay, which the graphics card understands to mean that it is to draw from the separate overlay buffer onto the screen. This technique has become known as "chroma key".

In some implementations, the video interface 190 may comprise a video hardware overlay module 440 to combine in the display device 191 different video and/or graphic data. One example is a combination comprising the video output of the video decoder 231 and the graphics or video generated with the assistance of user-downloaded application program 400. The video hardware overlay module may be configured by the GPU 410 or by the processing unit 120, for example using the graphics device driver 450 and/or the API 451. Other implementations may combine the different video and/or graphic data, such as, for example, the video output 441 of the video decoder 231 and the graphics or video generated with the assistance of a user-downloaded application program 400, without using a hardware overlay module.

In some implementations the video decoder 231 transmits video data to the video hardware overlay module 440 using a direct communication like the communication 241 shown in FIG. 4. In other implementations the video hardware overlay module 440 may access the video data output of a video decoder for example using RAM 137, the graphic processing unit (GPU) 410 or the processing unit 120.

Figure 5:
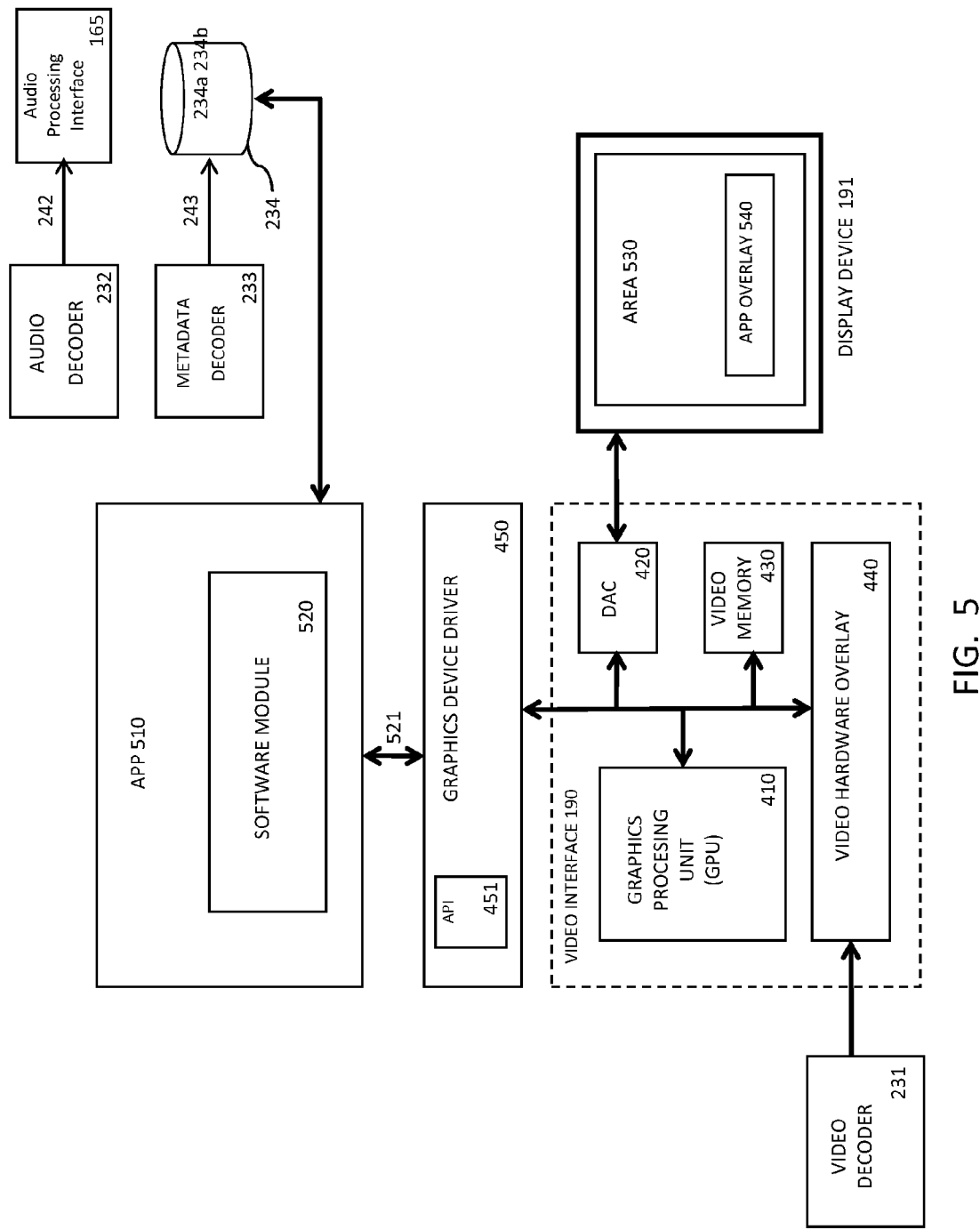
FIG. 5 illustrates a system according to one or multiple implementations.

FIG. 5 shows an implementation wherein the computing device 100 has selected a particular TV channel for playback, such as a digital TV channel. The selected TV channel may be, for example, of the type DVB, DVB-H, ATSC, ISDB-T, a cable TV channel, a satellite TV channel, etc. Henceforth we will refer to the different types of channels as television channels or TV channels.

Figure 1:
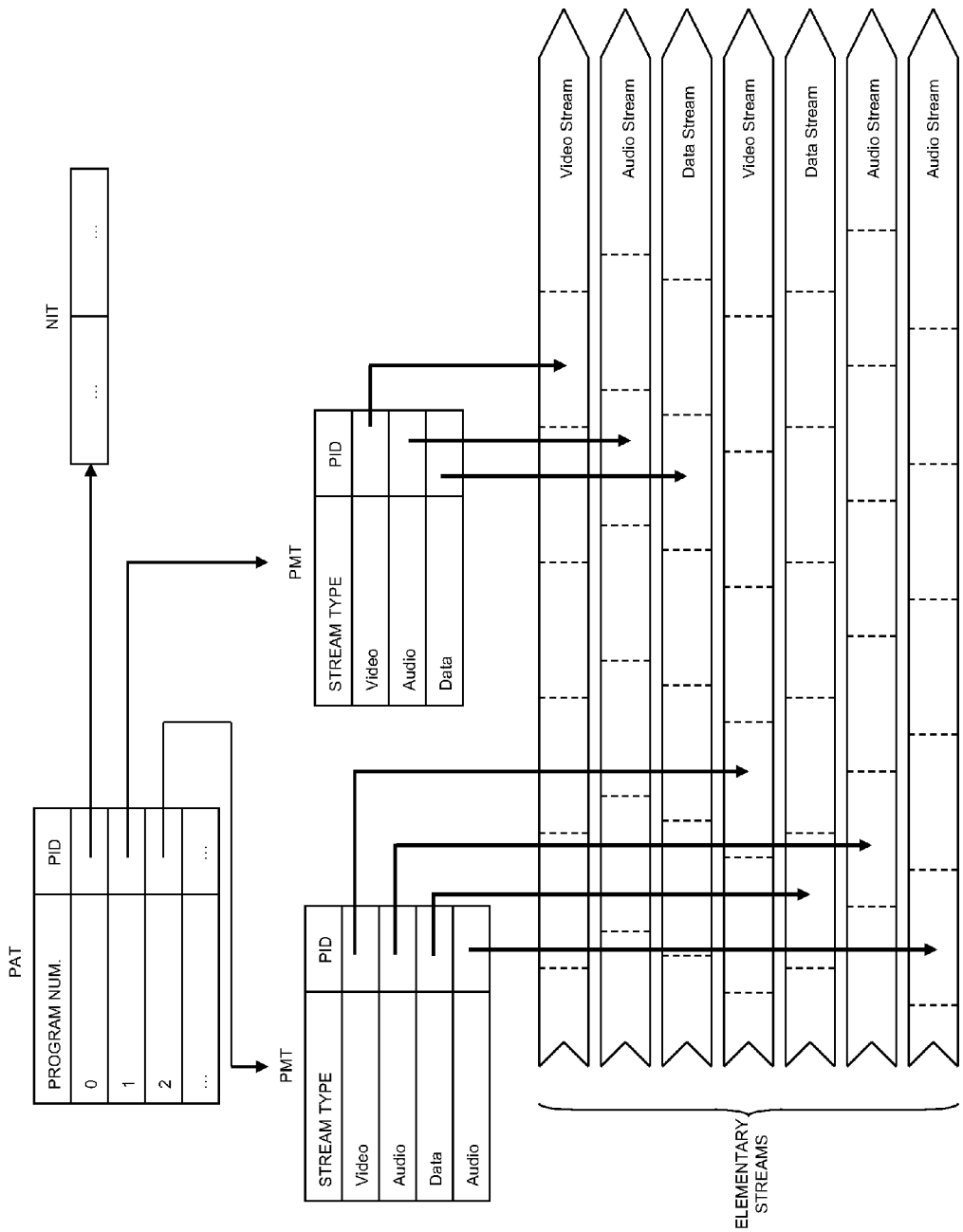
FIG. 1 is a diagram showing DVB MPEG-2 Elementary Streams, including audio streams, video streams, data streams and the associated Program Map Tables and Program Association Table.

In some implementations the video signal of a TV channel selected on the computing device 100 is presented in the area 530 of display device 191 while the audio signal from the selected TV channel is played through the audio processing interface 165 which can, for example, be equipped with internal speakers 167 or connected to external speakers 167 as shown in FIG. 1. The audio processing Interface can also be equipped to be connected to a headset or other audio representation devices.

FIG. 5 illustrates implementations where a software program 510 contains executable instructions running on the computing device 100. In some implementations APP 510 is software that runs on the computing device and which has been transmitted to the computing device via a data network accessed by the computing device, for example, using the network interface 170. The computer transmitting the APP 510 to computing device may be an Internet server or a website as explained in some examples below. In some implementations the software program APP 510 is a user-downloaded application program that may be downloaded into a memory of the computing device 100 by a user of the computing device from an on-line application store.

An on-line application store is an electronic store connected to the Internet which allows users to search, buy and/or download software programs to the computing device. These software programs are usually referred to as "Apps". These programs may be developed by third party developers using special programming tools specific to an application store and/or a specific device and/or a specific operating system. A third party developer may be a software developer company different from the company that develops and sells the computing device and the company that operates the application store. Usually the third party developer must register in an application store to offer its software product. An example of an application store is the Apple App Store where a user of Apple products, such as the iPhone, iPod Touch and iPad, may purchase and download application programs specific to such devices. Some applications of the Apple App Store may include software modules with specific functionalities. For example, the iPhone Store kit is a software module used to allow "in app purchase".

For the purposes of this description, software program or software product means a program consisting of a set of instructions loadable in a memory of a computing device and executable individually or in combination with another software program. Software products according to this definition are, for example, a computer program, a setup program that installs a program on a computer, an upgrade package of a computer program, an installation file for the online downloading of a computer program or an upgrade thereof, a computer program library, etc. Software module means a set of instructions integrated with, incorporated with, or otherwise designated to run with a software product to provide specific functions. Software modules may be, for example, a component, a function or set of functions, a dynamic library, a class or set of classes, a control or class with a graphical interface, etc.

In some implementations APP 510 accesses metadata 234a containing information on the TV channel selected by the computing device 100. The metadata 234a may be, for example, an identifier of the selected TV channel. In this manner APP 510 can know which TV channel has been selected or is being played in the computing device 100.

Metadata 234a may contain information about the selected TV channel in the computing device and on other TV channels accessible from the computing device 100.

In some implementations metadata 234a is obtained from the data signal 101. For example, in the case of DVB TV systems used in Europe, such as DVB-T, DVB-S or DVB-H, metadata 234a can be obtained from different table data, such as for example Service Information (SI), Program Specific Information (PSI) and Electronic Program Guide (EPG) data, as explained above. Based on the data from these tables that the computing device receives with data signal 101, the computing device stores metadata 234a accessible by APP 510.

There are numerous types of EPGs and/or metadata that are in use today. The implementations disclosed and contemplated herein related to EPGs and metadata are not intended to be limited to any particular type of EPG or metadata.

In the United States of America the Advanced Television System Committee (ATSC) standard has been developed for digital terrestrial and cable television. Like the SI and PSI tables in DVB, the ATSC standard utilizes Program and System Information Protocol (PSIP) tables. Japan has defined its own tables in its Integrated Services Digital Broadcasting-Terrestrial (ISDB-T) standard. These tables are called ARIB (Association of Radio Industries and Business). China has its own digital terrestrial television standard known as Digital Multimedia Broadcasting-Terrestrial (DNB-T) that utilizes metadata tables. In some implementations APP 510 has the ability to access metadata of multiple television systems that use different tables with different formats.

In some implementations metadata 234a may have the same structure as the metadata of the aforementioned television standards, such as DVB-SI, DVB-PSI, DVB-EPG, ATSC-PSIP, and ISDBT-ARIB. Other metadata defined by other standards can be equally used in other implementations.

In some implementations, metadata 234a is stored in a storage device 234 of the computing device 100 in a common format readable by the APP 510 program regardless of the television standard used by the computing device to receive the metadata. In such implementations the APP 510 program may read metadata 234a associated with multiple television standards. As an example, in some implementations the metadata of the different television standards is stored using the XML standard.

Figure 7:
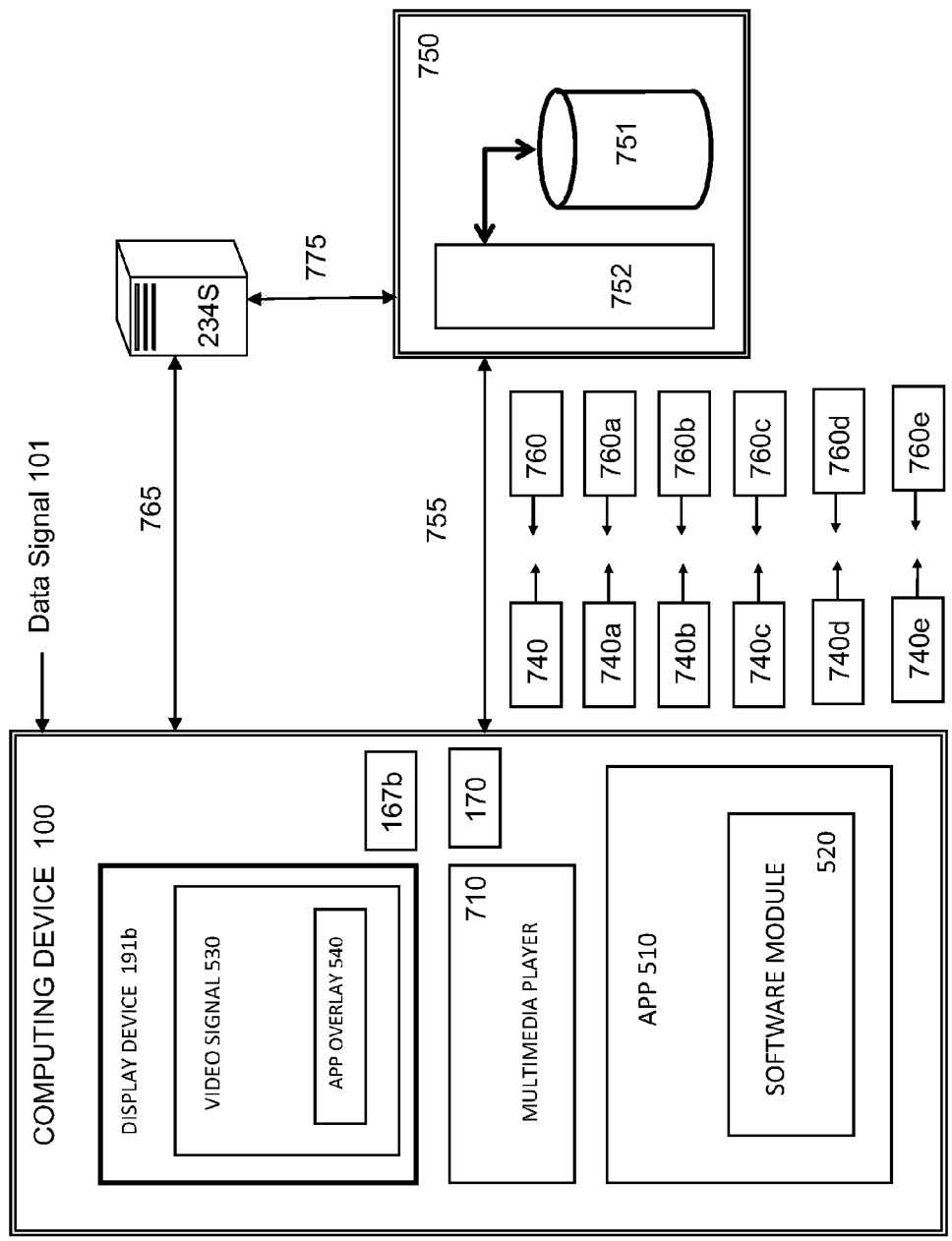
FIG. 7 illustrates a system according to one or multiple implementations.

In some implementations, the computing device 100 receives television information on-line through the network interface 170, for example through an internet connection with a data site 234S such as that depicted in FIG. 7. In some implementations the information accessed and transmitted to computing device 100 from site 234S is data 234b that identifies the television programs that may be received by the computing device via different television systems such as digital terrestrial television (e.g. DVB-T, ATSC, ISDB-t), Internet television (e.g. via IP unicast, multicast or broadcast packets), mobile digital television (e.g. DVB-H), etc. This advantageously enables the computing device 100 to receive from a single source data associated with different television systems.

In some implementations data 234b received by the computing device 100 from site 234S may include, for example, information that uniquely identifies each TV channel and the content that each channel is transmitting or is going to transmit. This information can be read by a program running on the computing device, for example to detect which is the television program selected and/or the content which is being played on the computing device. In some implementations the data 234b may also contain information on programs to be transmitted by one or more television channels in the next minutes, hours, days or weeks.

In some implementations data 234b may be stored on a computer other than the computing device 100, such as a server connected to the internet, and APP 510 can access data 234b via the Internet. In some implementations data 234b, or portions thereof, is stored in the computing device and is updated periodically through an internet communication with another computer that possesses the updated data 234b.

In some implementations the site 234S only transmits to the computing device 100 information associated with television channels that the computing device can receive. For example, information associated with a country, a given location of the computing device and/or information from pay television channels to which the computing device 100 user is subscribed.

In some implementations data 234a, 234b are stored in a memory 234 of the computing device 100 and APP 510 accesses the data 234a, 234b to obtain information on the program selected, such as for example one or more data identifying the selected program or information on future programs to be broadcast at the selected TV channel.

In some implementations APP 510 accesses the data 234a, 234b by use of a software module 520. The use of a software module to access data 234a, 234b relieves the APP 510 programmer from having to know in detail the operation of the data associated with the different television standards.

In some implementations APP 510 detects the TV channel selected on the computing device through executable instructions residing in a software module 520 that is incorporated into the APP 510. For example, the software module 520 may read the metadata associated with the channel selected and determine an IDTV identifier that uniquely identifies each TV channel. In some implementations APP 510 is configured to operate differently or to offer different functions based on the TV channel selected to be watched or being watched in the computing device 100.

In some implementations APP 510 is used in the transmission of a video signal or graphics that are displayed or superimposed on the area 530 along with other video or graphics. These overlay graphics or video are shown in FIG. 5 with the figure element indicated as APP overlay 540. Although FIG. 5 shows the APP overlay 540 element of a smaller size than the video area 530, in some implementations the APP overlay 540 may overlay the entirety of the area 530 or all images of the selected TV channel, thus showing the APP overlay 540 video instead of the selected TV channel video in the display device 191.

In some implementations, the computing device associates each different television channel with a unique identifier, such as an integer or a GUID (Global Unique Identifier), hereafter referred to as unique television channel identifier or IDTV. In some implementations the computing device 100 obtains the IDTV identifier for each television channel from metadata 234a, 234b, for example the IDTV datum that identifies each TV channel can be a datum or a combination of data from the metadata 234a, 234b associated with each television channel.

Figure 6:
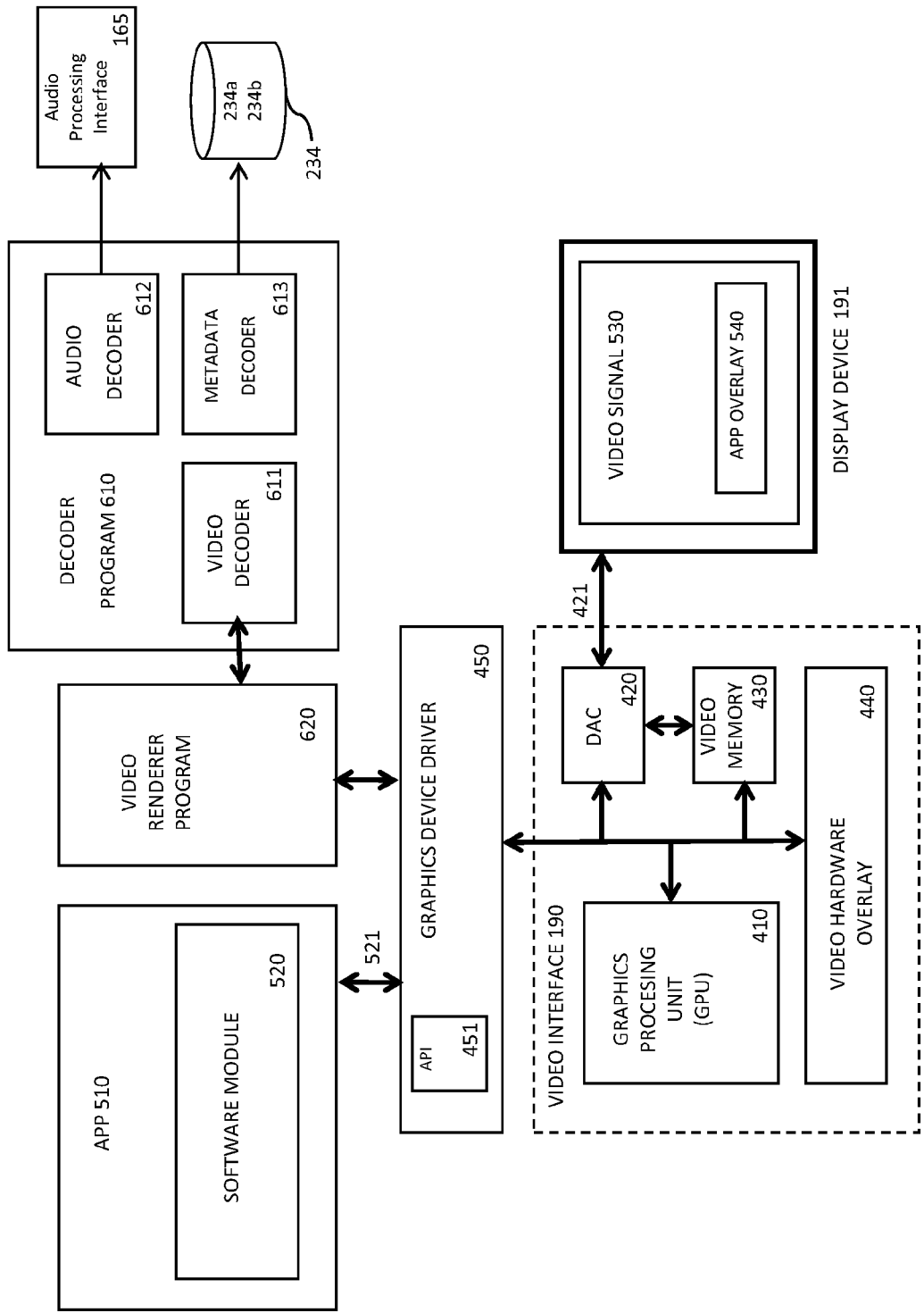
FIG. 6 illustrates a system according to one or multiple implementations.

In some implementations, the video decoder, audio decoder and metadata decoder are software decoders resident in a computing device resource, wherein the software decoder can be dynamically loaded to the memory 132 whenever the data decoding is required. The example of FIG. 6 shows an implementation with a decoder program 610 comprising an audio decoder 612, a video decoder 611 and a metadata decoder 613. Other implementations are possible. For example, the video decoder may be a hardware decoder and the audio and metadata decoder may be software decoders.

In some implementations of the example of the FIG. 6, the output of the audio decoder 612 is transmitted to the audio processing interface 165 or to a video renderer program 620. The output of the metadata decoder 613 is stored in the memory 234 accessible to the APP 510, the software module 520 (if applicable) and/or the video renderer program 620.

In some implementations, the output of the video decoder 611 is transmitted to the video renderer program 620, like for example a multimedia player, that communicates with the video interface 190 using the graphics device driver 450. The video renderer program may also communicate with the audio processing interface and synchronize the reproduction of video and audio.

FIG. 7 illustrates various implementations wherein the computing device 100 receives, through a network interface, data 760. Data 760 may include, for example, audio data, video data and/or other types of data and content. The other types of data, may include, for example, subtitles to be displayed in conjunction with the video data.

In some implementations data 760 resides in an external computing device 750, such as a server, and is accessible to computing device 100 via a data network 755. In some implementations the data network is the internet.

Hereafter computer 750 is referred to as site 750. A site refers to a computing device or a set of computing devices connected to a data network capable of exchanging information and services with other sites and computer devices through the data network. When the data network is the Internet, sites may be associated with a Uniform Resource Identifier (URI) to provide other computing devices and sites with access to data and services without entering the IP address of the site in the form of numbers. Communications between a site and another computer or site may use different protocols such as IPv4, IPv6 TCP/IP, UDP, RTP, RTSP, http, HTTPS, MOBILE IPv4, MOBILE IPv6, IPSEC, SNMP, SOAP, XML, IGMP, and others.

In some implementations site 750 comprises one or multiple servers running different programs, such as a web server 752, a database 751 and/or other programs. For example, site 750 may execute a program to transmit data between the site 750 and the computing device 100. Such a program may run on web server 752 or on the site 750 independently of the web server 752.

The example of FIG. 7 shows a display device 191b incorporated into the computing device itself. The display device may be, for example, an LCD screen and/or a touch screen that allows users to interact with a graphical interface of the computing device via the touch screen. As mentioned above, the display device can also be an external element.

FIG. 7 shows the use of internal speakers 167b. However, it is appreciated that the computing device may utilize other types of audio devices such as external speakers and headphones.

In the example of FIG. 7, the computing device plays a selected TV channel, for instance by playing video on the display device 191b and audio on the speakers 167b. In some implementations the computing device 100 transmits to site 750 data 740 that include information identifying the selected television channel which is being played on the computing device 100, for example by using the IDTV identifier explained above or any other data that identifies the TV channel selected in the computing device In some implementations, in response to receiving data 740 from computing device 100, site 750 transmits data 760 to the computing device 100 that includes content such as one or more of audio, video, subtitles, text, and/or graphics for such content to be played on the computing device together with the selected TV channel or replacing all or part of the contents of the selected TV channel.

In some implementations data 760 includes content that is displayed overlapping the content of the selected TV channel in the computing device 100. For example, data 760 may contain subtitles 760a in a given language and corresponding to the content of the television channel that is playing on the computing device 100, such as subtitles in a film or a TV series.

In some implementations data 760a are transmitted from the site 750 to the computing device 100 separately from the data 760. For example, the language of the subtitles 760a can be selected from the computing device 100 by transmitting identifying data 740a of the selected language to site 750. Data 740a may be transmitted to site 750 as a part of data 740 or may be transmitted to site 750 separately. In response to receiving data 760a from site 750, in some implementations the computing device displays the subtitles superimposed on the video corresponding to the television channel, for example in the APP 540 area as explained above.

When it is stated that some data can be transmitted together with the data 740 or data 760 it is understood that such data can be transmitted within the data 740 or 760 or can also be transmitted separately from the data 740 or 760, for example by using different IP packets, different UDP ports, different TCP/IP connections, etc. For example, site 750 may use different UDP ports and/or connections to transmit different streams of audio and video and can even use different source IP addresses, for example by transmitting a video stream from a server and an audio stream from another server that has a different IP address.

In some implementations APP 510 selects the subtitle language and causes it to be transmitted to site 750 in the 740a data along with the television channel identifier. In some implementations the same APP 510 receives in return data 760a and causes the subtitles to be displayed in the APP overlay 540 area, for example by calling functions of the aforementioned graphics device driver 450. In some implementations, the APP 510 produces a graphical interface that allows the user of the computing device 100 to select the subtitle language.

In some implementations a software module 520 is included with the APP 510 and performs some or all of the functions explained, such as for example detecting the selected TV channel, showing a graphical interface to select the subtitle language, sending the IDTV identifier and data 740a to site 750, receiving site subtitles 760a from site 750 and displaying subtitles 760a in the APP overlay 540 area. In some implementations, the software module 520 shows subtitles 760a in the APP overlay 540 area using the graphics device driver 450 and/or API 451.

In some implementations data 760 includes content that partially replaces contents of a selected TV channel. For example, a user of computing device 100 may select that all or portions of the audio of a selected TV channel be presented in a given language which results in audio data 760b being transmitted from site 750 to the computing device. In this manner, the audio data 760b may be reproduced in the computing device instead of the audio transmitted by the selected TV channel. This makes it possible, for example, to watch a film in a language other than the language in which the film is being broadcast on television.

In some implementations APP 510 is used to select an audio language to be played during the broadcast of a TV channel in the computing device and causes language identifying data 740b to be transmitted to site 750. In some implementations APP 510 receives or facilitates the reception of the audio data 760b in the chosen language and facilitates the playing of this audio through the speakers in synchronization with the TV channel video signal.

In some implementations a software module 520 associated with APP 510 performs some or all of the functions associated with causing audio data 760b to be played in the computing device 100. Such functions may include, for example, to detect the selected TV channel, to display a graphical interface to select the audio language, to send the IDTV identifier and data 740*b* to the site 750, to receive audio 760*b* from the site 750 and to play audio 760*b*.

In some implementations data 760 includes content that partially replaces contents of a selected TV channel while also superimposing on the content of a selected television channel. For example, in FIG. 7 data 760 may simultaneously contain audio data 760*b* and subtitle data 760*a* that when received in the computing device 100 is used to replace all or portions of the audio content of a selected TV channel while also superimposing subtitles 760*a* on the video display.

In some implementations APP 510 is useable for selecting a first language for subtitles and a second language for audio and for transmitting the first-language-identifying data 740*a* and the second-language-identifying data 740*b* together with the data 740 and with the television channel identifier. In some implementations the same APP 510 receives data 760*a* containing subtitles and data 760*b* containing the audio and plays the audio through the speakers in synchronization with the playing of the TV channel video signal and displays the subtitles in the APP overlay 540 area, for example by calling functions of the graphics device driver 450 and/or API 451. In some implementations, a software module 520 associated with the APP 510 performs some or all of these functions.

In some implementations, data 760 includes content that replaces the content of the selected television channel.

In some implementations APP 510 and/or software module 520 do not perform the aforementioned functions in their entirety. For example, in some implementations APP 510 and/or software module 520 may perform only portions of some of the functions. In some implementations APP 510 and/or software module 520 may only cause or facilitate the initiation of the functions within the computing device 100 without actually performing the functions themselves.

Figure 8:
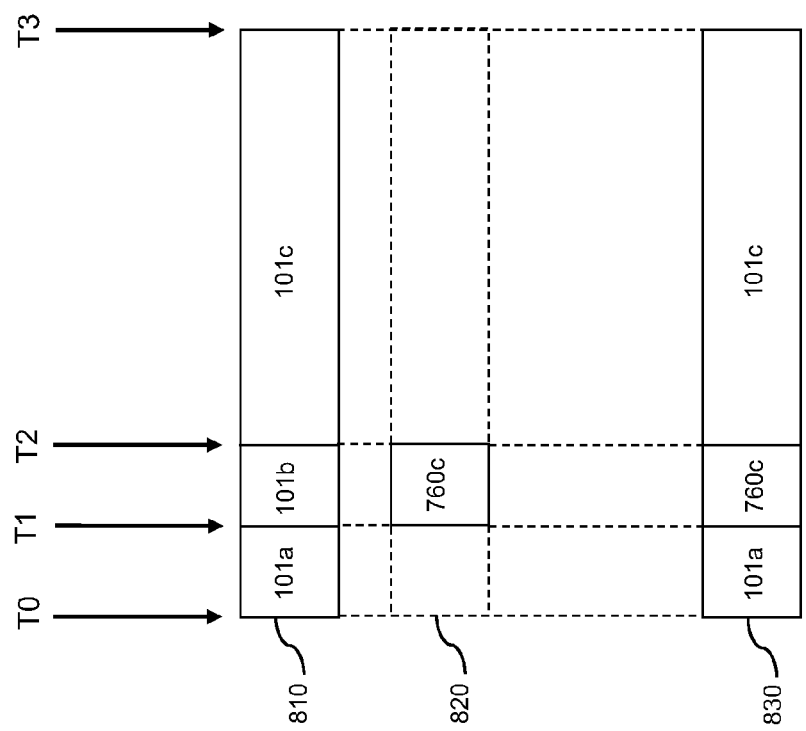
FIG. 8 illustrates a method according to one or multiple implementations wherein an application program executed in a computing device replaces broadcast transmitted content with internet transmitted content for the purpose of altering the intended presentation of the broadcast transmitted content in a video or audio device associated with the computing device.

FIG. 8 shows an implementation wherein the element 810 represents the content of a broadcast or multicast television channel selected in the computing device by a television channel that may contain audio, video and subtitles, for example received through the data signal 101 of FIG. 1. Element 820 represents the data transmitted by the site 750, for example through the Internet. The element 830 shows the content played on the computing device in accordance with one implementation where contents 810 and 820 are combined. Between the times T0 and T1 the computing device plays content 101*a* of the selected TV channel. Between the times T1 and T2, the computing device plays the content data 760*c* transmitted by the site 750. Between the times T2 and T3 the computing device returns to play the content 101*c* of the selected TV channel.

In some implementations APP 510 causes the content of the television channel to be replaced for the content 760*c* between the times T1 and T2. For example, APP 510 receives information from the site 750 indicating that between the times T1 and T2 it must reproduce the multimedia content 760*c* stored in the database 751 of site 750. In some implementations, in response the application program APP 510 communicates with the video interface 190 and the audio processing interface 165 and selects which video signal to process through the video interface 190 and which audio signal to process through the audio interface 165 at a given moment.

In some implementations the content 760*c* contains some advertisements, for example advertisements that subsidize the broadcasting of content on the television channel. Between the times T1 and T2 the TV channel can transmit advertisements 101*b* that the computing device 100 receives but replaces them with the advertisement content 760*c*. In this way, computing devices, such as televisions, which receive the selected television channel and do not have the APP 510, can display a common advertising content 101*b* while the computing device 100 can receive and display different advertisement content 760*c*.

In some implementations, the broadcast content transmitted to the computing device 100 does not include advertising content, but instead includes place holders that facilitate or otherwise enable the integration of advertising content or other content from a source other than the TV channel broadcast source. In some implementations the source other than the TV channel broadcast source is the internet.

It is important to note that the content integrated with or otherwise incorporated with the main content of the broadcast channel need not be advertising. For example, in some implementations the application program APP 510 received from an APP store enables a user to select the type of content to be integrated with or otherwise incorporated in the broadcast during for example the time interval T1-T2. For example, based upon the manner in which the APP 510 was received, the user may be presented with different content options. For example, if APP 510 was purchased for a fee from an APP store the user may be provided with a variety of options which may include edited scenes, trailers, actor or director profiles, actor or director interviews or commentary, short film/TV segments, news segments, general entertainment segments, entertainment segments or news segments associated with the broadcast, etc. In some implementations APP 510 may cause or facilitate web browsing, e-mail access, temporarily changing the selected channel to another channel, or other functions during the time interval T1-T2. The "another channel" may be pre-selected by a user of the computing device or automatically selected by the computing device. For example, if a user is watching a sports channel, movie channel, documentary channel or reality TV channel, then the "another channel" may be another sports, movie, documentary, or reality TV channel, respectively. In some implementations, the computing device automatically resumes representing (e.g., displaying the main content of the broadcast in the form of video and/or audio) in the computing device 100 when the time interval expires, while in other implementations the computing device may produce an alert when the time interval expires and provide a user of the computing device an option to resume the broadcast or to continue with an existing or other activity.

In some implementations the other functions facilitated by APP 510 during the time interval T1-T2 may include the initiations or resumption of a video game, a gaming operation, or other activity. For example, if the selected TV channel content is a soccer match, during the time interval T1-T2, a soccer video game is made available for use by a user or users of the computing device. The video game may be for example one that has been previously stored on the computing device or one made accessible on-line via the internet. The video game may be a single user game or one that permits multi-viewer participation. In some implementations the video game is made available free of charge for a selected period of time (e.g., the duration of the selected TV channel program, the duration the selected TV channel is being played in the computing device, a pre-determined time period, etc.) or for a selected number of play sessions.

It is important to note that the terms "integrated with" and "incorporated in" are not to be construed in a limiting manner. The terms are meant to include any means used to facilitate the playing of a broadcast content with other content. The other content may be content previous stored in a memory of the computing device 100. The content previously stored may be content from a broadcast previously played in the computing device, content from a source other than the broadcast source, etc. For example, when a broadcast includes a sporting event the computing device may store in memory certain previously played highlights and during the time interval T1-T2 the computing device replays all or some of the stored highlights. The same is applicable to movies and other forms of content where certain scenes of the selected broadcast channel (e.g., favourite scenes) are stored in the computing device. In some implementations the highlights/scenes are predetermined by the broadcast source, while in other implementations the highlights/scenes are selected by a user of the computing device during the playing of the selected broadcast in the computing device. For example, during the playing of the selected TV channel some of the content may be temporarily stored in a buffer or other memory device and upon a user selecting a user-interface function (e.g., by use of key of a remote control device, selection of a display icon, etc.) all or a portion of the content stored in the buffer is selected to be replayed during time interval T1-T2. In some implementations the broadcast content includes markers or other information that identifies or delineates scenes or content segments. This facilitates the storing of complete scenes or content segments in the buffer or other memory device. Thus, upon a user making a selection of a content segment to be replayed, the computing device stores the highlights/scenes by use of the identifiers or delineations.

In some implementations or all of the implementations disclosed herein, the application program APP 510, and or a software module associated with APP 510, provides or facilitates the implementation capabilities. For example, an application program APP 510 that related to a golfing channel may be purchased on-line from the computing device from an APP store. Upon the application program APP 510 being downloaded and/or activated in the computing device, one or more functions may be automatically activated or otherwise selected by a user of the computing device to alter a predetermined reproduction of the broadcast content of the golfing channel. For example, a capability of initiating a video golfing game during broadcast segments that would otherwise involve the playing of advertisements may be enabled. In this example, as well with others, the selected TV channel broadcast signal may include data that is used to access a video game on-line that represents the same course, playing field, participants, etc. as those involved in the selected TV channel broadcast.

In some implementations the computing device 100 does not allow the user to change the channel or skip the advertising content 760c. For example, the APP 510 may contain executable instructions that when executed in processing unit 120 block channel changing in the signal interface 110 using for example a configuration register of the signal interface 110. The processing unit 120 can use a configuration register in the interface signal that indicates whether the channel can be changed or not.

In some implementations processing unit 120 transmits to the signal interface 110 the time duration of content 760c and the time T1 when content 760c begins. In response, the signal interface 110 of the computing device 100 restricts or prevents the changing of the channel between times T1 and T2.

In some implementations executable instructions implemented in the processing unit 120 of the computing device 100 detect if the user tries to change the channel during playback of the advertising content 760c and causes a display a message, for example indicating that the television content being received is funded by the advertising and that he or she must wait until the advertising has finished to change the channel.

In some implementations a display message is caused to be produced in a user interface of the computing device that allows the user to choose between changing the channel and not being able to continue watching the contents of the selected TV channel for a certain time or playing the advertising content and continue to watch the contents of the television channel. The certain time may be, for example, the duration of the television program, a chapter of a serial or other content.

In some implementations the executable instructions that control whether the computing device 100 can change TV channels, display messages and/or user interfaces are included in the APP 510 and/or software module 520.

In some implementations site 750 transmits content 760c to the computing device before time T1 and the computing device can locally store file content 760c to play it from the time T1.

In some implementations computing device 100 receives the content transmitted by the site 750 using a streaming protocol, such as using RTSP and RTP protocols In some implementations the computing device 100, its operating system and/or APP 510 may use different buffers for storing data 760, for example audio, video and/or subtitle data, and facilitate the synchronization of the audio, video and subtitles of a given content, such as a film or a television channel.

The streaming protocol RTSP (Real Time Streaming Protocol), is described in RFC 2326 specifications published online by IETF (Schulzrine H. et al., Internet Engineering Task Force, Network Working Group, Request for Comments 2326, April 1998; currently available on the Internet http://www.ietf.org/rfc/rfc2326.txt) RTSP protocol operation is closely related to two other protocols of the IETF (Internet Engineering Task Force): SDP and RTP protocols. The SDP (Session Description Protocol) is described in RFC 4566 specifications published online by IETF. (M. Handley et al., Request For Comments 4566, Network Working Group, July 2006, now available on the Internet at http://www.ietf.org/rfc/rfc4566.txt). The RTP (Real-time Transport Protocol) is described in RFC 3550 specifications published online by IETF (H. Schultzrinne. et al., Request For Comment 3550, Network Working Group, July 2003, currently available on the Internet: http://www.ietf.org/rfc/rfc3550.txt).

In some implementations APP 510 causes content 760c to directly play on the display device 191b and speakers 167b, for example by directly accessing the graphics device driver and the driver of the audio processing interface.

In some implementations the application program APP 510 establishes communication with the multimedia player 710 in a manner that enables the multimedia player to reproduce content 760c on the display device 191b and speakers 167b.

Figure 9:
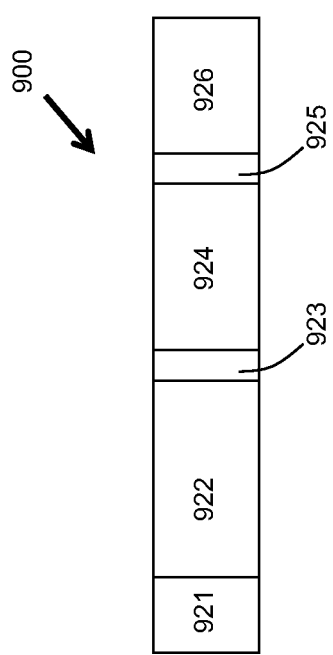
FIG. 9 illustrates an example of broadcast transmitted content received in a computing device the computing device that contain multiple portions of advertising and various portions of non-advertising content.

Although FIG. 8 shows for the sake of simplicity content 810 that contains a single piece of advertising 101b, other configurations are possible. For example, in other implementations, such as in the example shown in FIG. 9, the content received by the computing device via the signal 101, such as for example a TV channel, may contain multiple pieces of advertising and various pieces of non-advertising content. FIG. 9 shows an example of content 900 with three pieces of advertising 921, 923 and 925 and three pieces of non-advertising content 922, 924 and 926.

In some implementations the computing device 100 may receive from an internet site, such as site 750, advertising content based on the geographical location of the computing device or any other information associated with the computing device or the user of the computing device. Thus, not all computing devices 100 playing a selected TV channel may receive the same advertising content 760c. In some implementations the computing device sends to site 750 data 740c associated with the computing device or user with the data being used by the site 750 to select the most appropriate advertising content 760c.

In some implementations data 740c may include information that identifies the computing device 100 user in the database 751. For example, the computing device user may have registered in a web page of the web server 752 of site 750, transmitting registration data which are stored in the database 751. Upon registration, the user can choose identifier data, such as for example the e-mail address or other identifier data, and a password that allows the user, for example, to access his or her data and modify them. In the registration process with the website server 752, the user may enter different data that can be used by the site 750 to select the advertising 760c. For example, site 750 may select the advertising 760c taking into account any combination of the following user data: age, gender (male or female), occupation, hobbies, favourite brands of certain products or services, annual revenue of the user, user address coordinates such as longitude and latitude or GPS coordinates, zip code, population, area or region, country, state, a language for example specified by the user through the registration process and/or any other information entered by the user in the registration process.

In some implementations site 750 also may select the advertising content 760c by using data related to the computing device, such as any combination of the following data: type of computing device used as well as brand and model, IP address used by the computing device to communicate with the site 750, level 2 address in the OSI model of a computing device network interface such as a MAC-type address, a level 2 address in the OSI model of network interface of a router that communicates with the computing device such as a MAC-type address of a WiFi router used by the computing device to access Internet and to communicate with the site 750 through the Internet.

In some implementations site 750 can determine the approximate location of the computing device 100 and use this approximate location as one of the criteria for selecting the advertising content 760c. For example, the site 750 can determine the approximate location of the computing device based on the IP address used to communicate with the site 750 or on the MAC address of the WiFi router used by the computing device to access the internet.

It is to be appreciated that location information may be used in conjunction with some or all of the implementations disclosed herein. For example, when a selected TV channel broadcast reproduction in a computing device is altered to include news content in lieu of advertisement content, the news content may be location specific.

There are databases for determining the approximate location of a computing device based on the MAC address of the WIFI router used by the computing device. These databases were originally created by cars driving on the streets with a GPS which recorded the MAC Address of the WiFi routers they detected. This technique was used by the companies Skyhook and Google. A more recent approach to create such a database is used by some mobile services of mobile phones, for example, the iPhone, which in certain privacy settings, records the WIFI routers detected, associating GPS type coordinates to them and sends that information to Apple. Even some desktop computers, such as the Apple iMAC, record WIFI routers detected and periodically send that information to Apple.

In some implementations site 750 has access to a WiFi routers database used to determine the approximate position of the computing device 100. In some implementations a WiFi routers database can be part of the site 750 or may be an external database, for example, from an external service provider that supplies this information to site 750.

In some implementations the computing device may incorporate a GPS and send location data to the site 750, for example included in the data 740c.

In some implementations device 100 uses different communication protocols to receive content, such as the aforementioned RTSP, RTP and SDP protocols or other protocols such as HTML 5, Flash, and any other protocol or standard allowing the download and progressive playback of multimedia content or the download and subsequent playback of multimedia content.

Figure 10:
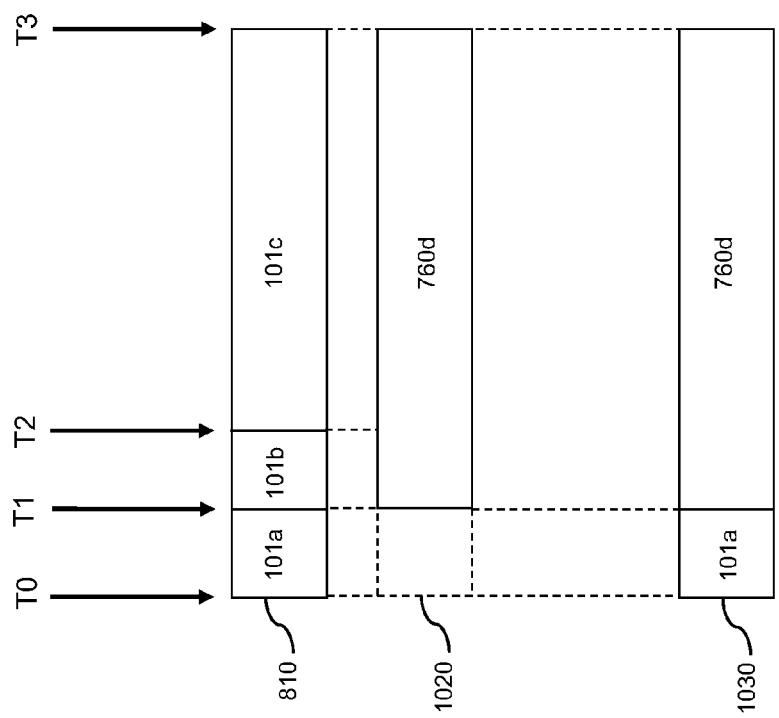
FIG. 10 illustrates an example where a computing device plays at different times content related to a TV channel selected in the computing device, the content comprising broadcast transmitted content and on-line internet transmitted content.

FIG. 10 shows an example wherein the computing device plays between times T0 and T1 content 101a of the selected television channel, for example a TV channel being received by the data signal 101. In the example shown in FIG. 10, from the time T1 the computing device receives content 760d, for instance a content 760d transmitted by the site 750 using a streaming protocol.

In some implementations content 760d is the continuation of content 101a without including advertising. This allows, for example, a user to start watching a film or a TV series that can be received via the data signal 101 and at time T1 when the advertising content 101b starts, the user decides to view the content without advertising and sends data 740d to establish communication with the site 750 to continue watching the film or television series through streaming and without advertising. In some implementations data 740d may include information to select an audio and/or subtitle language other than those used in the content 101a.

In some implementations the computing device 100 and/or user of the computing device 100 are registered with the site 750. The site 750 can charge users a fee for transmitting the content 760d through streaming, for example by charging a fee (e.g., $0.99) to a credit card of the user. In some implementations the amount charged to the user by site 750 varies depending on the content transmitted and/or depending on the definition of the content. For instance a higher fee may be charged for HD (high definition) content and a lower fee for low definition content.

In some implementations the computing device 100 can transmit data 740d and start receiving streaming content from the site 750 at any time from the time T0 without needing to wait for time T1.

In some implementations the computing device can send data 740d and start receiving streaming content from the site 750 prior to the time T0. In one embodiment, site 750 may charge a fee to the user of the computing device 100 depending on when the user requests to receive streaming content.

Figure 11:
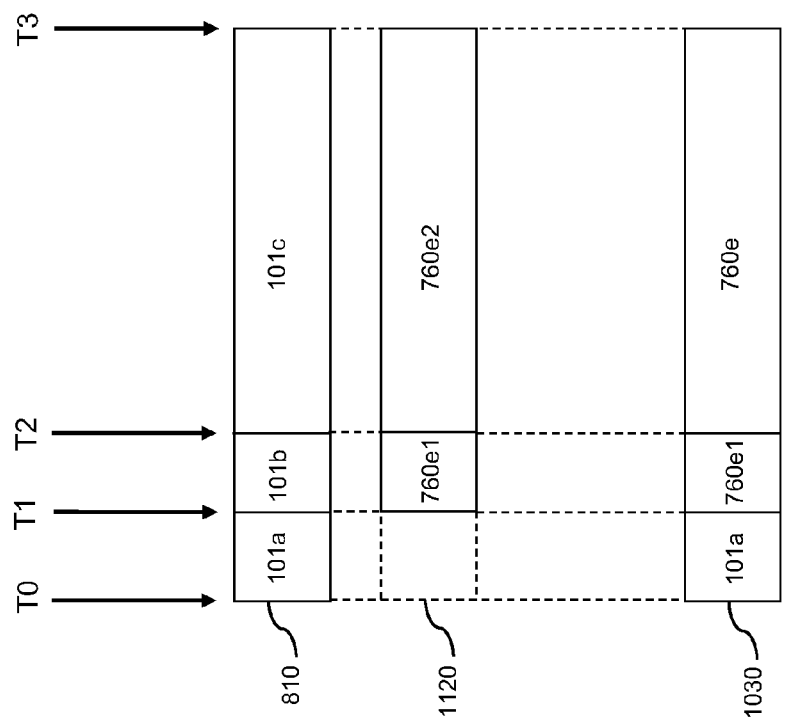
FIG. 11 illustrates another example of presenting both broadcast transmitted content and on-line internet transmitted content in a video device and/or audio device associated with a computing device that receives the transmitted content.

FIG. 11 shows an example wherein the computing device 100 plays between times T0 and T1 content 101a of the selected television channel, for example a television channel that is received via the data signal 101. In the example of FIG. 11, from the time T1 the computing device receives advertising content 760e1 transmitted by the website 750 using a streaming protocol and from the time T2 the user receives a non-advertising content 760e2 similar to content 101c with the difference that content 760e2 is transmitted via streaming to the computing device.

In some implementations the advertising content 760e1 is content selected by site 750 based on data associated with the computing device 100 such as for instance geographic location or any other data referred to above. This allows the replacing of non-customized advertisements 101b with customized advertisements 760e1.

In the example of FIG. 11, a user may decide to watch streaming content from an on-line source and initiates a streaming session by sending data 740d to site 750 to continue watching the film or television series through streaming. In some implementations the computing device 100 and/or user of the computing device 100 are registered with site 750.

In some implementations the computing device can send data 740d to site 750 to initiate receiving streaming content from the site 750 prior to the time T1, for example at a time between T0 and T1, and site 750 can transmit more or less advertising content depending on the time at which the content is transmitted. In some implementations the computing may send data 740d to site 750 to initiate receiving streaming content prior to time T0.

In some implementations, as shown in the examples of FIGS. 10 and 11, the user has a set time to watch the content (e.g., minutes, hours, days, weeks etc.).

In the United States of America it is usual for televisions to broadcast content with advertising, such as television serials, and this content can be watched by streaming the next day or several days after it having been broadcasted on television, whether by paying (e.g. at Amazon.com, Apple iTunes online stores, etc.) or by receiving the content with advertising (e.g. via site www.hulu.com).

In some implementations, time T0 is the time at which the content, a television series for example, is first broadcast on television.

Figure 12:
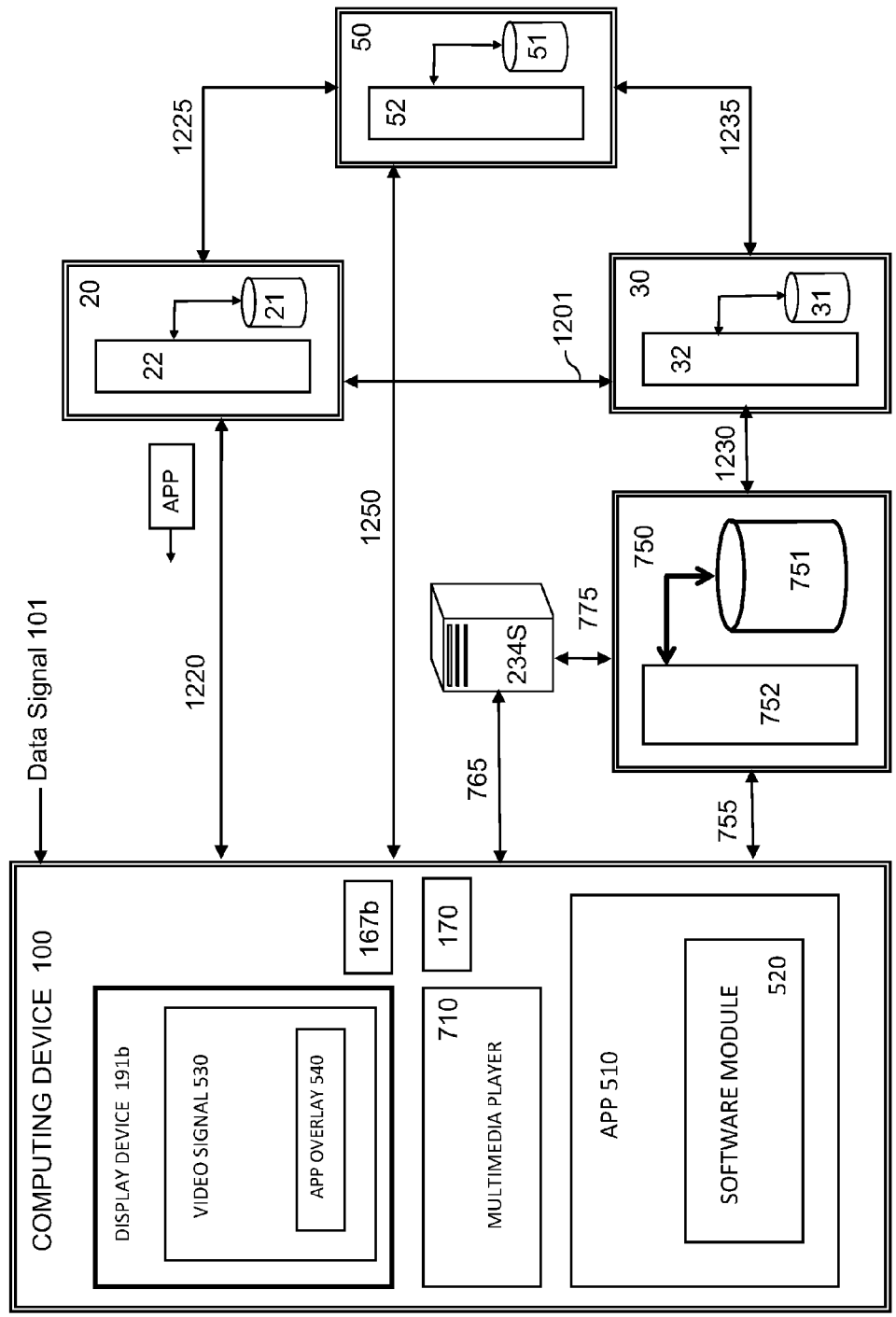
FIG. 12 illustrates a system and methods according to one or multiple implementations.

Although FIG. 7 shows a single site 750, in some implementations multiple sites may be involved, for example, by establishing communications between different sites through the Internet. FIG. 12 shows an example of some implementations that involve the use of multiple sites.

In some implementations the application program APP 510 purchased on-line and downloaded to computing device 100 enables the content of a broadcast program to be downloaded or streamed to the computing device from an on-line source prior to the scheduled broadcast time. In some implementations, an application program APP 510 purchased on-line and downloaded to computing device enables a user of the computing device to divert the reception of content from a broadcast source to an on-line source. For example, a user may begin watching a TV program that includes advertising from a broadcast source and may, by the use of an application program 510, divert the reception of the TV program content to an on-line source (e.g., streaming source) that transmits the content without advertising In some implementations an application program APP 510 purchased on-line and downloaded to computing device 100 provides passwords, codes, decryption, descrambling, or other data that is useable to enable an encrypted, scrambled, or otherwise unavailable broadcast channel to be received and/or viewed in the computing device. For example, in lieu of paying a monthly fee to obtain access to the Discovery Channel, a user of the computing device may purchase on-line an application program APP 510 that when downloaded to the computing device enables receiving and/or viewing of the Discovery Channel for a designated time period or permits the viewing of a specific program or sets of programs. In some implementations APP 510 provides functions or otherwise enables the reception and/or viewing. The functions may be, for example, decryption and/or unscrambling functions. The functions may also include providing decryption keys, passwords or other data that is transmitted to a set-top box, or other equipment within or associated with the computing device, that cause the other equipment to appropriately decrypt, unscramble, or otherwise make available broadcast content normally not receivable or viewable in the computing device.

In some implementations the program APP 510 is acquired and/or downloaded online from an application store or vendor site 20. In some implementations, the APP 510 contains a software module 520. When the program APP 510 is executed in the computing device 100, it performs one or more of the implementations disclosed herein. In some implementations APP 510 uses the software module 520 to perform one or more processes, for example the implementations disclosed in conjunction with FIGS. 7 to 11. The software module 520 may interact with the application program APP 510, for example, by a series of functions, classes or methods.

In the example of FIG. 12, the data network in which the processes are executed is the Internet. In some implementations the system may be made up of at least one developer company having a developer site 30, at least one vendor site 20 where the software product APP is offered, and a plurality of computing devices 100 (only one shown in FIG. 12). In some implementations the vendor site 20 is an application store, like for example the Apple App Store or the Android Marketplace In some implementations site 234S and a supervising site 50 are also involved. The vendor site 20, the developer site 30 and the supervising site 50 may execute different program applications like for example a main webpage, respectively 22, 32, 52, and a database, respectively 21, 31, 51.

In some implementations site 30 and site 750 are different sites that may communicate with each other using the communication 1230. In some implementations the developer site 30 and the site 750 may be the same site.

Software products APP 510 are generally computer programs and may comprise entire programs, an installation program which installs a computer program or downloads the installation files from a computer program, upgrades or updates of programs that are already installed, etc.

In this example, the user chooses an application program APP 510 offered on the vendor site 20 and downloads the program APP into the computing device 100 using communications 1220. APP 510 is downloaded on-line to the computing device 100 that is the equipment where the program APP 510 will be executed. In some implementations APP 510 is purchased and/or downloaded from another computing device and then installed and executed in computing device 100.

In some implementations the computing device 100 establishes communication with the vendor site 20 directly through communication 1220 or indirectly via the supervising site 50 through communication 1225 and/or 1250.

In some implementations the vendor site 20 or the supervising site 50 deal with authenticating the identity of the computing device 100 or the user of the computing device using communications 1220 or 1250, respectively.

Identifying data of the vendor site 20, and/or the computing device 100, and/or the user of the computing device may be transmitted along with the download of APP 510 into the computing device 100. The transmission of this identifying data can be done in different ways.

In some implementations APP 510 is contained in a single downloadable file that possesses the identifying data, for example, in the form of metadata. In some implementations inclusion of identifying data is performed at the vendor site before or during the download.

In some implementations the identifying data is transmitted to the computing device 100 separately from APP 510. In some implementations the identifying data is stored in the computing device 100 and may be read by the APP 510 and/or the software module 520.

In some implementations the vendor site 20 provides to the user of the computing device the identifying data or a code associated with the identifying data, for example, by an on-screen display or by sending an e-mail, during the download of APP 510, and the user later subsequently furnishes the identifying data and/or code to APP 510 and/or software module 520 at the request of the latter.

In some implementations the vendor site 20 and the developer site 30 exchange information relating to the download and/or purchase of APP 510. For example, on-line communication 1201 may allow the developer site 30 to know that APP 510 has been downloaded and/or paid for from a specific and authorized vendor site 20. When a purchase of APP 510 has been completed through an authorized vendor site 20, the vendor site 20 may send a copy of the purchase receipt to the developer site 30 via on-line communication 1201.

A software module means a set of instructions integrated with, incorporated with, or otherwise designated to run with a software product to provide specific functions. Software modules may be, for example, a component, a function or set of functions, a dynamic library, a class or set of classes, a control or class with a graphical interface, etc.

The software module 520 operation may be identical or different for different software developer sites or developer companies. In some implementations, to distinguish between different sites 750, developer sites 30 and/or vendor sites 20, modifiable properties of the software module 520 may be modified during design time or programming time. In other implementations, modifiable properties of the software module may be modified during execution time, for example during the execution of an application program in the computing device 100 that uses or contains the software module.

In some implementations, the software module 520 may contain a class or a group of classes with their corresponding properties and methods, which allows by interface or integration thereof in an application, the execution of certain functionalities which are predefined in the software module.

In some implementations the software module may comprise executable instructions, for example an executable file or dynamic library, which are included or invoked from a program application, during the design time or execution time of said application, for example executing some executable instructions of the software module within the execution environment of said application.

In some implementations the software module may comprise source code that may be converted to executable instructions, for example using a compiler, a just in time compiler or an interpreter.

According to some implementations, software module incorporation refers to interfacing and/or integrating the software module in the application program in design or programming time of the application program.

The ways of including a software module within an application may vary according to the programmer or the developer tool in which the application is programmed, the following ways of doing so being the most common examples:

Including the software module from a graphic menu. The programmer drags the software module (graphic representation thereof) from the toolbox of the programming environment and inserts the software module in the application. From that moment on, the programmer has access to the software module properties and methods, and can modify them and/or invoke the methods that have been described in the software module.

Including the software module from source code. The programmer includes the code lines necessary for invoking the software module (whether it is in library or executable form) within the source code block belonging to a form of the application. From that moment on the programmer has access to the software module properties and methods and can modify them and/or invoke the methods which have been described in the software module.

One skilled in the art of programming may include a software module within a program in different ways and the different implementations are not limited to this description.

The software module 520 may communicate with the site 750 using the communications 755.

Optionally, instead of setting up direct communication 755 with the site 750, the application program or software module 520 may do so by indirect communications 1250, 1235, and 1230 with the supervising site 50, which in turn sets up communications 1235 and/or 1230 with the developer site 30.

In some implementations, the system is supervised by a supervising site 50 controlled by a supervising entity although the system implementations are not limited to such a configuration. Moreover, a plurality of supervising sites can be provided. The developer sites which adhere to the system request the supervising site 50 to register their sites and identify the programs which they wish to offer in the vendor site(s) along with defining the condition for the sale or download thereof. The vendors that wish to offer on their sites the application programs request in the supervisor site to register their vendor site. A developer site and a vendor site can agree, in the supervising site, on the conditions of the sale of a program, for example, the sale price and the allocation of sales revenue.

In some implementations the supervising site provides the software module 520 to the developer site 30 so that the software module may be incorporated with the application programs. The vendor sites can obtain the programs directly from the developer site 30 or through the supervising site 50 (as the case may be).

In addition to the component 520 supplied to the developer site 30 so that the component can be incorporated with their application programs, the supervising site may also provide specific applications which may be executed remotely, for example with a browser, or which may be installed in the developer sites and in the vendor sites for the purpose of implementing communications associated with the different process.

In some implementations where the user pays to receive on-line content in a desired manner (e.g., without advertising), the user may submit payment information to one or more of sites 20, 50, 30 and 750. Other payments systems like, for example, Paypal or Google Checkout may also be used. In some implementations the purchase transaction is accomplished through the vendor site 20 with the download of the content to the computing device occurring from a different site such as, for example, site 750.

In some implementations where the user receives content with advertisement, the vendor site 20, the supervising site 50 and/or the developer site 30 may receive a fixed amount or a percentage of the amount paid by advertisers, for each advertisement received in the computing device 100 by means of APP 510.

In some implementations, an APP executing in the computing device contains the software module 520 that allows the application APP to detect the TV channel that the computing device 100 has selected and/or is being reproduced, for example a TV channel transmitted in the Data Signal 101

In other implementations, the software module 520 may be an external software module not included in the application APP that wants to receive or access data identifying the TV channel currently being selected and/or reproduced in the computing device 100. The APP may call the functions of the external software module 520.

In some implementations, the software module 520 may be part of the operating system of the computing device 100 and the APPS running on the computing device can use the functionality of the software module 520, for example, by calling the operating system functions that implement the functionality of the software module 520.

In some implementations, the software module 520 may be included in a first application APP1 or a software program that runs on the computing device 100 and a second application APP2 different than the first application APP1 can execute the software module instructions 520 using any known method of communication between software programs running on a single computing device. For example, application APP2 can make calls to functions or methods of the first application APP1 which implement the functionality of the software module 520.

In some other implementations, the software module 520 may be a plug-in that runs on a browser or Web browser of computing device 100.

In some implementations, the software module 520 functioning in the computing device 100 causes a transmission of data to an external server derived from the content of the selected TV channel and receives information that identifies the TV channel currently being selected and/or reproduced in the computing device 100. For example the software module may cause computing device 100 to transmit to an external server first data containing some seconds or milliseconds of audio data of the selected TV channel along with second data that indicates the time when the audio data was received in the computing device 100 and the external servers detect which channel is reproduced in the computing device and transmits to software module 520 an identifier of the channel selected and/or reproduced in the computing device 100.

Other implementations may transmit to the external server or servers other types of data derived from the content of the selected TV channel like, for example, video frames, part of video frames, metadata, sounds, subtitles or any combination thereof. In some implementations, the external server may be the server 234S.

Some social networks have developed tools to allow developers to integrate their websites with the social network sites. Facebook Platform, Google Friend Connect, and the Twitter API are examples of these tools. A description of these tools may be found in the book "The Developer's Guide to Social Programming. Building Social Context Using Facebook, Google Friend Connect, and the Twitter API", Mark D. Hawker, published by Addison Wesley in August 2010. Today many of the Web's most popular sites are linked to Facebook, through Share or Like or Connect buttons.

Also, some social networks have been designed to be used with smartphone software applications, usually called "apps". Foursquare is an example of a successful social network application for smartphones that uses geolocation to offer some social network features by establishing a connection between the Foursquare app executing in the smartphone and the Foursquare social network site. Recently, Facebook has added its own geolocation features in its smartphone apps to compete with new successful social networks such as Foursquare.

Figure 13:
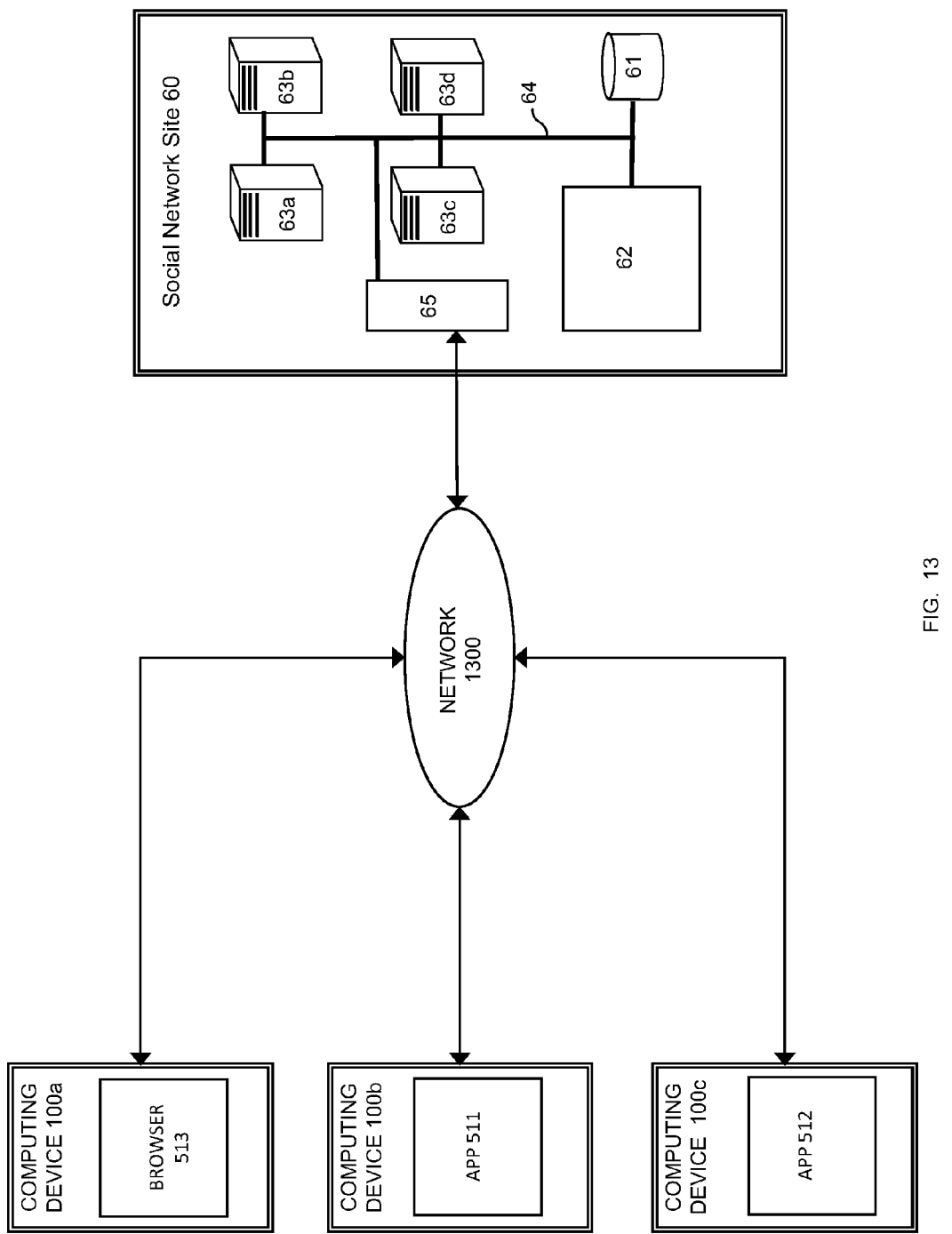
FIG. 13 illustrates a system and methods according to one or multiple implementations.

FIG. 13 shows an example implementation of a social network site 60. In the example of FIG. 13, three computing devices 100a, 100b and 100c, use a browser or Internet browser-type program 513, an application APP 511 and an application APP 512 respectively, to transmit and receive data from the social site 60 or between them by means of a data network 1300, such as the Internet. In the example shown in FIG. 13, the social site 60 has four servers 63a 63b, 63c and 63d connected by a data network 64. The site 60 is connected to the data network 1300 by one or more network devices 65 (only one shown in FIG. 13) such as routers, switches and firewalls. It also has an application 62, for example an application that displays a web interface. The social site 60 also has data storage means 61.

The following describes implementations of the social site 60. However, other social network implementations are also possible, using a different number of elements and distributing the various functions between different elements in different ways.

In some implementations, the computing devices 100a, 100b and 100c may use a browser-type program or an application to communicate with the social site 60, for example by means of application 62, which allows users to register and interact with one another. The application 62 may, for example, display different types of data for each user, including profile information, or relationships between a user and others. For example, the relationships that the user of computing device 100a has with users of computing devices 100b and 100c.

In some implementations, the application 62 is associated with a website which is usable from a browser, such as the browser 513. In one implementation, application 62 may use other communication protocols (e.g., HTTP, XML, web services, etc.) to communicate with the computing device, for example to communicate with the application APP 511.

In one implementation, the server 63a performs the functions of registering, authenticating and authorizing the computing devices and/or users who use computing devices to allow them to connect and communicate with the social site 60 to transmit and receive data to the social site 60 and to other computing devices.

In some implementations the computing devices may transmit to the social site 60 data that comprises information that identifies the computing devices 100a, 100b and 100c or identifies the user in the database 61. For example, the computing device user may have registered at a web page of the web server 63a of site 60, transmitting registration data which are stored in the database 61. Upon registration, the user can choose identifier data, such as for example the e-mail address or other identifier data, and a password that allows the user, for example, to access his or her data and modify them.

Once a user has registered on the social site 60 he or she may transmit data, such as personal information, to the social site 60 in the form of text messages, pictures, photos, videos, audio, URL or URI type web links, geographic data, geographic coordinates such as GPS, location data, information on events and other social data that the social site 60 receives and stores associated with the user in the database 61.

In some implementations, the server 63b executes a software program editor of social relations which it receives from the computing devices 100a, 100b and 100c, data indicating a type of relationship between users of computing devices and the software program which stores in storage means 61 data regarding the type of relationship between the users. The editor of social relations software can also generate and send communications to the computing devices to confirm the type of social relations.

For example, users of computing devices 100a and 100b can register on the site 60 using the application 62 and select the names user100a and user100b. Once registered, the user100a can request to establish a relationship with the user100b using the software program editor of social relations of the server 63b. The server 63b may send a communication or message to the user100b so that this user confirms the relationship with the user100a. If the user100b responds with a message or communication indicating that he or she accepts the type of social relationship created by user100a, the server 63b stores the social relationship in a database or storage means 61.

The type of relationship established between user100a and user100b can be, for example, being friends, belonging to the same club, team, gymnasium or school, having a subject, class or profession in common, having planned to attend or having attended to an event such as a sporting or religious event, a conference or trade show, having common hobbies or tastes, such as on a type of music or film, etc.

Each type of social network can establish different types of relationships between different social network users.

In some social networks, like Twitter, a user can publish in the network short messages, such as for example up to 140 characters, and users who wish to receive these messages "subscribe" to the user who publishes the messages to receive them. At the same time the user who publishes the messages may also be registered to receive messages from other users. When a user has subscribed to receive messages, a "follower" type of social relationship is stored in the social network.

New types of social relationships between users can be defined in the program that runs on the server 63b assigning to each new type of relationship a unique identifier (for example an integer or alphanumeric code) and a description of the type of social relationship while storing that information in a database of site 60.

In some implementations the server 63c executes a software program that lets one see relationships between users and their associated data, such as photographs, videos and personal profile data of users who are linked between them. The server 63c also allows other functions for users to interconnect, such as users sending messages, emails or establishing voice communications, such as voice over IP (VoIP) or video communications such as videoconferences.

In some implementations the server 63d runs a program or software programs that allows the social site 60 to communicate with a software application running on a computing device.

The database or storage means 61 can use any storage device or storage means to store the information for each user and their relationships and communications with other users. Moreover, the data may be stored in one or more remote locations.

In some social networks, social network members can join or create relationships based on groups. These groups may include people with the same interests, such as a football team, a band, a personal hobby, a brand of clothing, etc. Each user can create his own group with those who share the same interests.

Some implementations enable the creation of various types of groups with different privacy settings and accepting new members in the group.

Some implementations have an open public group of users who have a common interest or who want to show their affinity with the aim of the group. The open public group interactions are typically public and visible in search engines pages, the content can be viewed without being a member of the page. Non-members typically cannot add content.

A "page" does not follow the typical format of the group because there are no members. Joining a "page" is typically accomplished by simply clicking on an icon on the page itself. After joining a page a member is generally free to add content.

Other implementations enable the creation of groups that have administrators and members.

The following are examples of groups:

Open group: Any user can join this group and invite others to do so, in this way, any user can view the information and content of the group and add their own content. Joining is automatic, so no-one needs to accept or confirm the request to join the group.

Closed or Private Group: For a new member to join the group, the group administrators must approve an application for membership. The group appears in the search engine results but the contents cannot be viewed. Any user can view the description of the group, but only members may view the contents and add new content.

Secret Group: The group does not appear as the result of a search or on the profiles of the group members. Only people who receive an invitation from a group member may join. Only members can view group information and content and add new content to the group.

In some implementations, the administrator or administrators can change the settings of the groups so that the restrictions respect to the possibility of publishing content can vary.

The form for the creation of a group typically includes information fields such as group name, description and some relevant searchable data. In some situations, when the social site group includes an administrator, the administrator can delete or report inappropriate content.

According to other implementations the social network site has functionalities similar to that of Twitter and enables the creation of a user to publish content, for example, in the form of short messages. In turn, a user can be a "follower" of another user, thus creating a link between the two of them allowing him/her to receive content that this user posts and view other users' comments to that content A user may directly become a "follower" of another user, without the need for the user followed to have to decide whether or not to accept that relationship. However there may be settings that can protect publications, so that only accepted users allowed to follow these publications may see them.

User messages can be searched based on keywords or "topics", such as, for example. messages that talk about a theme or content on a single common interest, similar to what a group would be.

Figure 14:
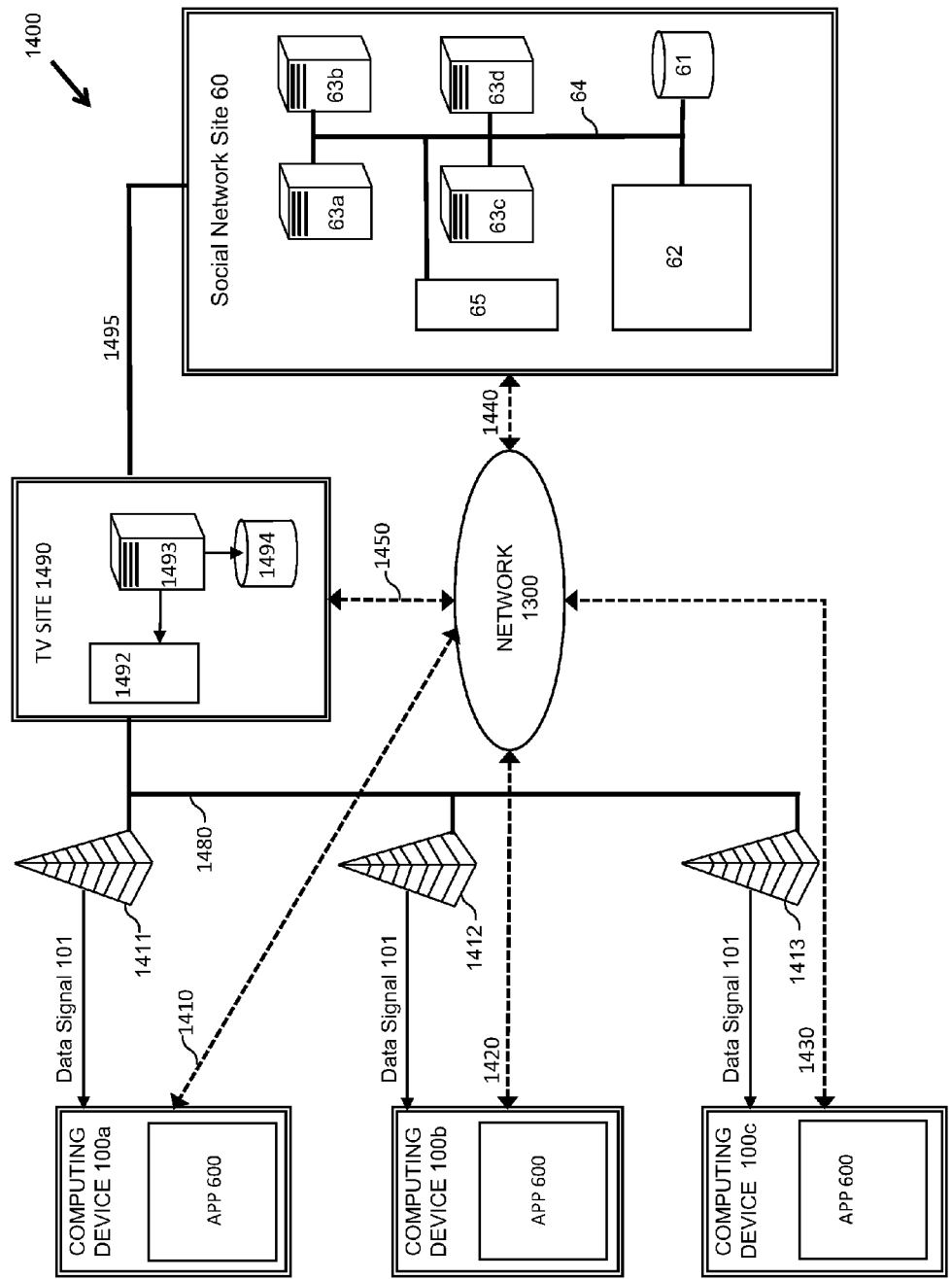
FIG. 14 illustrates a system and methods according to one or multiple implementations.

The example of FIG. 14 shows three computing devices 100a, 100b and 100c that communicate with the social site 60 through network 1300 using communications 1410, 1420 and 1430, respectively. The social site 60 communicates with network 1300 using communication 1440. In one implementation the network 1300 is the internet.

In one implementation, the computing devices 100a, 100b and 100c are similar to the computing device 100 explained before, for example in the implementation of FIGS. 2a, 2b, 3, 4, 5 and 6.

In some implementations, a computing device 100a, 100b, 100c can communicate with the social site 60, for example using an application program APP 600 executing in one or more processors of the computing device.

The example of FIG. 14 shows a TV site 1490 broadcasting the data signal 101 using, for example, network 1480 and antennas 1411, 1412 and 1413 that receive the signal from the TV site and broadcast the data signal 101, for example using wireless technology, to be received by the devices 100a, 100b, 100c. In one implementation, the antennas 1411, 1412 and 1413 use broadcast TV technologies such as, for example, NTSC, ATSC, Pal, DVB or other TV technologies.

It is important to note that the use of the term "antenna" is in no way intended to be limiting and includes any device, apparatus, system, or combinations thereof, capable of transmitting a data signal associated with a broadcasting entity to a computing device. Moreover, the broadcast transmission is not limited to wireless transmissions. In addition, it is also important to note that the term "TV site" is meant to include any media source capable of broadcasting, rebroadcasting, or otherwise relaying a data signal intended to be received, at least in part, by multiple computing devices. For example, according to some implementations the "TV site" is an entity that provides entertainment programming to a computing device by the use of multicast technology via a data network, such as the internet.

In some implementations the data signal 101 may be transmitted to the devices 100a, 100b and 100c using wireless technologies like WIFI, WIMAX, UMTS, 3gpp, 3gpp2, LTE, or other wireless technologies.

The TV site 1490 is connected to the network 1300 by communication 1450. In one implementation, the TV site 1490 is connected to the social network site 60 using a communication 1495, for example an Ethernet network or a VPN (Virtual Private Network).

In one implementation the TV site 1490 comprises a broadcast module 1492 that transmits one or more TV signals to antennas 1411, 1412 and 1413 using network 1480. The TV site may also comprise one or more servers 1493 and one or more databases or storage medium 1494.

In some implementations, the computing devices 100a, 100b and 100c execute a "login in" process with the social site 60 before receiving and/or transmitting information to social site 60 and/or other users.

In one implementation, some computing devices send data to a social site 60 that contains information about the television program selected in the computing device, for example using an identifier such as IDTV explained above, that identifies each television channel, using the metadata 234a and/or 234b or using any other method to detect the TV channel currently being selected and/or reproduced in the computing device.

The social site 60 receives information from the television channels that are being reproduced on some computing devices and can transmit this information to other users, like users who are "logged in" on the social site 60 and have some kind of social relationship stored in the social site 60. Thus if, for example, users of the computing devices 100a and 100b have established a relationship of friendship, social site 60 may allow the users to share this information.

In some implementations, the application APP 600 shows on the display of the computing device 100b information about the television channel currently being played by the computing devices 100a and 100c. The application APP 600 can, for example, display this information overlaid on the television channel content currently playing.

In one implementation, the social site 60 can group all the information it receives from various computing devices in a single television channel to show it to the users. For example, the social site can display real-time audience of each television channel, in absolute form (number of computing devices that have logged into the social site and which reproduce each TV channel) or as percentage (percentage of computing devices that have logged into the social site and which reproduce each TV channel calculated on the total number of computing devices that play TV channels and send information to the social site).

In some implementations, the user of the computing device 100b may have stored on social site 60 social relationships with a large number of other social site 60 users, such as hundreds or thousands of other users. In some implementations, the application APP 600 displays information, for example, aggregated information. The aggregated information may be, for example, the total number of users associated with the social network site 60 who are concurrently watching the program. Other examples may include a display of the identity of users having a social relationship with the user of computing device 100b who are logged-in to the social network site 60 and watching the same TV channel, demographic information of those watching the same TV channel, etc. In some implementations the social site only consider users that have stored in the social site 60 a particular social relationship with the user of computing device 100b, such as for example, having a friend relationship.

In some implementations, the computing device 100b can exchange information in real time with the computing devices of other users who are watching the same television channel as the one played on the computing device 100b and also have a social relationship stored in the social site 60. For example, they can exchange information as text messages displayed on the screens of the computing devices superimposed on the television channel or audio messages played on the loudspeakers of the computing devices, etc.

In some implementations, a user of a computing device who is watching a particular television channel can send a message to social site 60 with information such as "I like it" indicating that the user of the computing device likes the content being watched on the television channel. Other users of the social site 60 can access this information and thus the social site 60 facilitates the making of recommendations of TV channels in real time. Conversely, the message may contain negative information, such as "I don't like it".

In some implementations, the computing device 100b may receive, through the social site 60, information transmitted by other users with whom there exists a "follower"-type social relationship as explained above in the Twitter social network. Thus, for example, in some implementations a first computing device of a first user can transmit data to the social site 60 related with content that is being transmitted or is about to be transmitted by a particular television channel, and users who have established in the social network 60 a "followers"-type relationship with the first user can receive and view on their computing devices the data transmitted by the first user, such as texts, forums, voice messages such as VoIP (Voice over IP), video messages or other data transmitted by the first user. In some implementations these messages are displayed simultaneously on the screen of the computing device with the content of television channel, for example, superimposed on the screen content.

In some implementations, a user can transmit data to the social site 60 and other users who have a "followers"-type social relationship can receive and view these data in their computing devices regardless of the selected TV channel in the computing device seeing the data. For example, a user can be watching a TV news channel or be changing TV channels while viewing superimposed on the screen of his or her computing device messages from those he or she has a social relationship stored in the social site 60, such as messages related to stock quotes, weather, etc. that the user can read or watch independently of the selected TV channel or while the user is changing the TV channel.

In one implementation, a user can select and store in the social site 60 information about other users associated with each TV channel. For example, a user may want to receive or transmit information to or from users userA, userB and userC when he or she is watching a first TV channel TV1 and receive and/or transmit information to or from other users userD, userE and userF when he or she is watching another TV channel TV2. This information about users associated with each TV channel is stored in the social site 60.

Figure 15:
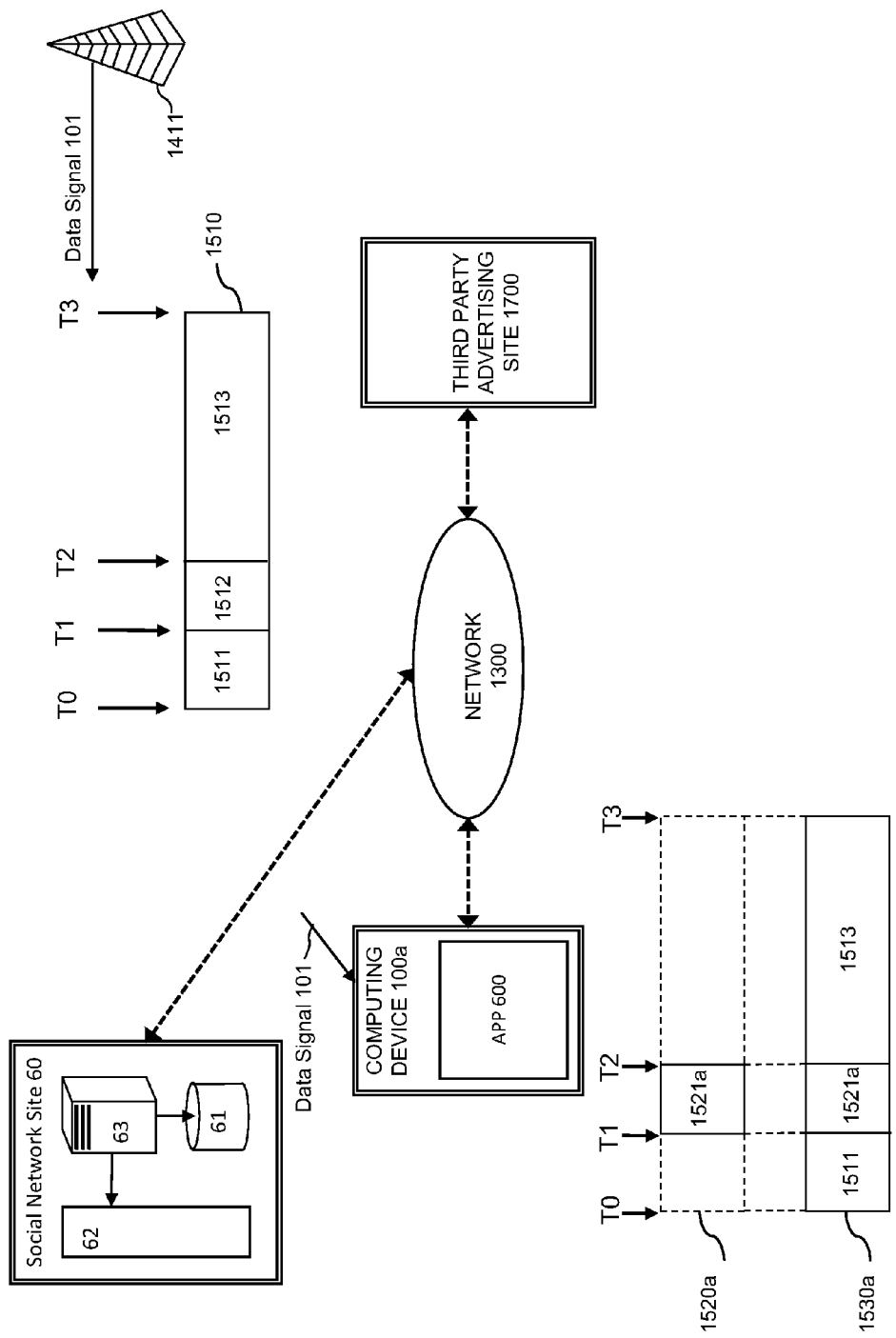
FIG. 15 illustrates a system and methods according to one or multiple implementations.

FIG. 15 illustrates an implementation where a computing device 100a receives one or more first data signals 101 comprising a first content 1510 and receives a second content 1521a via the social site 60. An application 600 executing in a microprocessor of the computing device 100a selects which content, for example the first content or the second content, is reproduced in the computing device 100a during different time intervals.

FIG. 15 shows a single antenna 1411 transmitting the one or more data signals 101 to computing devices 100a and 100b. It is appreciated however, that more than one antenna may be involved in the transmission. For example, in some implementations different antennas corresponding to different geographic areas may transmit the data signal 101 to the different devices. In other implementations different antennas may be used to transmit data signal 101 to different devices in different locations.

In the example of FIG. 15, the element 1510 represents the content of one TV channel transmitted in the one or more data signals 101. The TV channel will be referred to as TV channel 15.

In the example of FIG. 15 element 1510 of TV channel 15 comprises three parts 1511, 1512 and 1513. Between instant T0 and T1 the TV channel 15 transmits the content 1511. Between the instants T1 and T2 the TV channel 15 transmits the content 1512 which may comprise, for example, advertising content that is a different type of content than the first content 1511. Between instants T2 and T3 the TV channel 15 transmits content 1513 which may be similar to content 1511 (e.g. a continuation of a program that began with the first content 1511).

In the example of FIG. 15, the element 1510 comprises one advertising content portion 1512 and two program content portions 1511 and 1513. It is appreciated however, that the implementations disclosed and contemplated herein are not limited to any particular number of different content portions, and may, for example, comprise any number of program content portions and advertising portions. Moreover, it is important to note that content portion 1512 is not limited to advertising, but may comprise any of a variety of other types of content.

A traditional viewing of channel 15 involves receiving one or more data signals 101 comprising content 1510 in a device capable of either audibly and/or visually reproducing the content for the enjoyment of a user of the device.

With continued reference to FIG. 15, elements 1520a and 1530a illustrates an example of a process in the computing device 100a to select between the first content from channel 15 and a second content received in the computing device 100a from the social site 60, indicated as element 1521a. As will be discussed in more detail below, in some implementations the content 1521a may be received in the computing device 100a from a source other than the social site 60.

The element 1530a shows a content to be reproduced in the computing device 100a, for using, for example, the APP 600 executing in a microprocessor of the computing device 100a. Content 1511 from channel 15 is designated to be reproduced between instants T0 and T1, content 1521a from the social site 60 is designated to be reproduced between instant T1 and T2 and the content 1513 from channel 15 is designated to be reproduced between instants T2 and T3.

In one implementation, the content 1521a received by the computing device 100a from the social site 60 contains advertisements and the application APP 600 either directly or indirectly causes the one or more of the advertisements 1512 transmitted from channel 15 to be replaced with the advertisements 1521a transmitted from the social site 60 to the computing device 100a.

In some implementations, the social site 60 selects and transmits the advertisements comprised in 1521a using data stored in the social site 60 associated with the user of the computing device 100a. The social site data may comprise, for example, user profile information, his/her relationships with other users, information in the profiles of the other users having a relationship with the user, the IP address of the computing device 100a, his/her geographic location, his/her preferences, his/her age, etc. In this way a broadcast advertisement 1512 is replaced in the computing device with targeted advertisement 1521a based on at least a portion of the information the social site 60 stores about the user of the computing device 100a. In some implementations the IP address of the computing device 100a and/or geographic location information of the computing device 100a is also used in the selection of the targeted advertisement in conjunction with information associated with the social site.

In one implementation, the social site 60 includes a capability for receiving and storing advertising preference data associated with a user. If a user is expecting the arrival of baby, she/he may select a preference for receiving advertisements related to baby care and parenting. If a user is planning to take a vacation to a particular destination, a preference to receive advertisements related to the travel destination may be selected. These are just two of many advertising preference criteria that may be selected and stored by the social site 60 for a particular user/member.

It is important to note that content portion 1521a is not limited to advertising, but may comprise any of a variety of other types of content that has been selected by use of the social site 60, or by use of social site data, to replace content 1512. For example, the content portion may include text and/or audio and/or video messages from other social site users, music, cartoons, videos, etc. Moreover, content 1521a may or may not reside with the social site 60. For example, the content 1521a may reside with a third party advertising site 1700. In one implementation the social site 60 stores an index of advertisements that are selectable by use of one or more of the user data discussed above and sends instructions to the third party advertising site 1700 to transmit to the social site 60 and/or the computing device 100a the selected targeted advertising 1521a. In one implementation the selected targeted advertising is stored in a file associated with the user in the social site 60 and used in the future selection of advertisements. In another implementation the social site 60 sends advertising selection data to the third party advertising site 1700 and the third party advertising site 1700 selects the targeted advertising 1521a.

In another implementation the application 600 executing in the computing device may be used to facilitate an exchange of information between the channel 15 source and the social site 60 through the computing device 100a. In this manner the channel 15 source may use the social site data provided to it to select the content of portion 1512 or replace the content portion 1512 with targeted content. The content 1512 and/or the targeted content may or may note reside with the channel 15 source. For example, the contents may reside with a third party advertising site, such as site 1700.

In some implementations, the source and/or content of an original advertising content 1512 is also used in the selection of content 1521a. For example, since a contractual business relationship between the original advertising source (e.g., BMW) and the source of channel 15 likely exists, the content 1521a to replace content 1512 is selected from the same advertising source so as not to interfere with the contractual obligations/relationship of the parties involved. For example, a sporting event sponsored by BMW advertising has an original content 1512 related to a sports utility vehicle with a target audience comprising older or family oriented viewers. However, the social site 60 data of the user of computing device 100a who is watching channel 15 indicates that the user is young and single. In such an instance, for example, the social site data in combination with the advertising source information may be used to select a BMW motorcycle advertisement to replace content 1512 that included the BMW sports utility vehicle advertisement. In some implementations, the one or more data signals 101 associated with broadcast content 1510 comprises data that identifies the advertising sources.

In some implementations, at the beginning T0 of a broadcast of content 1510, or at one or more instances between T0 and T1, the broadcast source 1700 transmits to the computing device 100a data related to the intended advertising content and/or data related to the intended advertising source and this data is used in the computing device 100a in the selection of the targeted advertising 1521a. In some implementations the channel source 1700 transmits to the computing device 100a all relevant advertising data useable in selecting targeted advertising at the beginning of the broadcast T0, or at a time prior to a first advertising content portion.

In some instance, as mentioned below, a broadcast content may comprise a portion 1512 devoid of content but yet intended for advertising content, or other content. In some implementations the channel source 1700 has a contractual obligation to ensure an advertisement from a particular advertising source occupies the broadcast between intervals T1 and T2. In such instances, in some implementations, the channel source 170 transmits to the computing device 100a data related to the intended advertising source and this data is used in the computing device 100a in the selection of the targeted advertising 1521a.

In the discussion above, many of the explanations have been directed to a replacement of content 1512 with content 1521a. The implementations disclosed herein are not limited to such a replacement. For example, in some implementations content portion 1512 may be devoid of content.

In some implementations, APP 600 facilitates the communication and transmission of data between the computing device 100a and the one or more other entities (e.g., social site 60, channel 15 source, third party advertising site, etc.) involved in the selection and transmission of content 1521a to the computing device 100a. A more detailed explanation of some implementations of APP 600 is provided below.

In some implementations computing device 100a may receive from an internet site, such as social site 60, advertising content based on the geographical location of the computing device or any other information associated with the computing device or the user of the computing device stored in the social site 60.

In some implementations, the data 1521a is transmitted from the social site 60 to the computing device 100a using a streaming technology like, for example, Flash, RSTP, RTP, RTCP, HTML5 or other streaming technologies.

In some implementations, the social site 60 may start the transmission of the data 1521a to the computing device in an instant before T1, and the computing device may store the received portion of the data 1521a,1521b in a storage medium, for example a cache memory, and start the reproduction of the content 1521a in the instant T1.

In some implementations, the channel 15 source transmits first information to the computing device 100a indicating the instant T1 and/or identifying the data 1521a.

In some implementations the first information is transmitted in the one or more data signals 101, for example as metadata of the channel 15 source. In some implementations, the metadata transmitted by a first antenna is different than the metadata transmitted by a second antenna (not shown in FIG. 15) and different devices receiving the data signal 101 may receive different T1 information and different information identifying the data 1521a. For example, an antenna transmitting to the state of New York may transmit different first information than an antenna transmitting to the state of Washington.

In one implementation the APP 600 may be used in the computing device with a plurality of channel sources. In one implementation, the APP 600 transmits information to the social site 60 identifying the channel source currently being selected in the computing device and the social site 60 uses this information and the information stored in the social site 60 associated with the user of the computer device to select the advertisement content to be transmitted to each device.

In some implementations, the APP 600 stores information identifying each of the advertisements received from the social site 60 and reproduced in the computing device associated with each channel source. The APP 600 may transmit this information to the social site 60 and the social site 60 may store this information received from each device and use it to charge the advertisers and/or to compensate the channel sources for replacing their advertisements.

In other implementation, the operating system of the computer devices stores information identifying each of the advertisements received from the social site 60 and reproduced in the computing device associated with each channel source. The APP 600 or the operating system may transmit this information from the computing devices to the social site 60 and the social site 60 may store this information received from each device and use it to charge the advertisers and/or to compensate the channel sources for replacing their advertisements.

Figure 16:
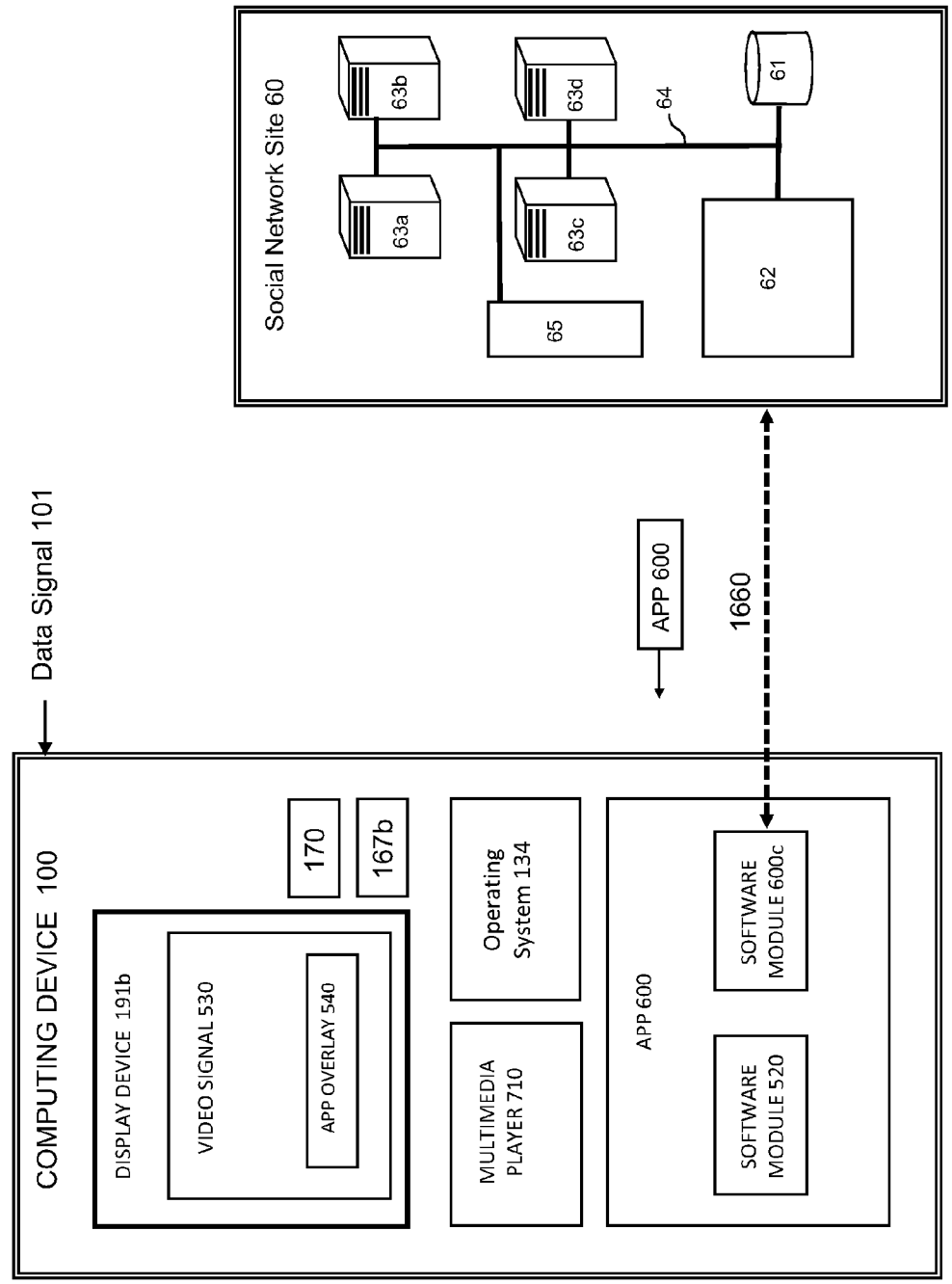
FIG. 16 illustrates a system and methods according to one or multiple implementations.
Figure 17:
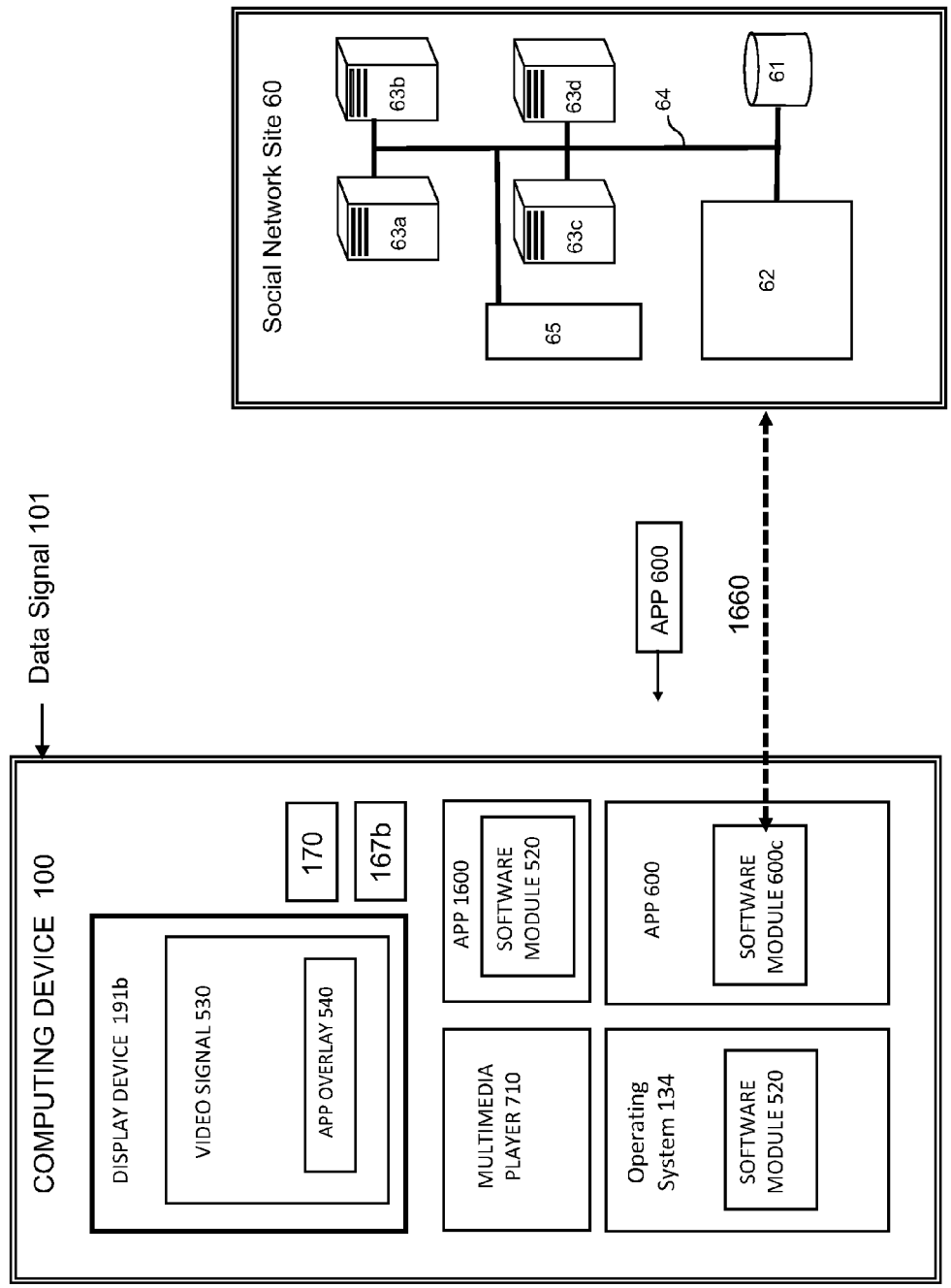
FIG. 17 illustrates a system and methods according to one or multiple implementations.

FIGS. 16 and 17 illustrate examples of communications between one computing device 100 and social site 60. The communications between the computing device 100 and the social site 60 is shown by dotted line 1660, although such communications may be communications that uses different networks.

In the example of FIG. 16, the APP 600 comprises a software module 600c and a software module 520. In one implementation, software module 600c is a software module/component that facilitates communication between the computing device 100 and the social site 60. For example, APP 600 may allow the computing device 100 user to "log-in" with the social site 60 so that the computer device has access to user's data stored in the social site 60 associated to users who are logged in.

In some implementations, the login into social site 60 can be done automatically from the computing device 100 without requiring user intervention. Optionally, the user can disable this option or choose in which television channels she or he wants to enable automatic login.

In some implementations, the software module 520 executes some or all the features discussed in the examples and implementations of FIGS. 5 to 15. For example, in one implementation the software 520 module is used to identify the channel source selected and being played by a computing device 100 and makes this information available to the APP

600. In one implementation, the software module establishes a communication with external server 234S to obtain such information.

FIG. 17 shows different implementations of external software module 520 in the computing device 100. In one implementation, the software runs on an APP 1600 application, and the APP 600 can use the software module 520 functionality establishing communication with the APP 1600, for example by calls to class methods or APP 1600 functions.

In other implementations, the software module is part of the operating system 134 of computing device 100 and the APP 600 can use the software module functionality, for example calling functions or class methods of the operating system.

In some implementations, APP 600 transmits information to the social site that identifies the APP 600 and the social site 60 verifies that the APP 600 is authorized to replace the advertisement of a channel source before sending the advertisement to the computing device.

In some implementations, the data signal 101 transmits the TV channel 15 in encrypted form and the social site 60 transmits a key to the computing device to decrypt channel 15.

In some implementations, APP 600 uses the key to decrypt and reproduce the content of TV channel 15. In some implementations the APP 600 doesn't permit the reproduction of the content of TV channel 15 until all the previous advertisements transmitted from the social site to the computing device are reproduced in the computing device.

Figure 18:
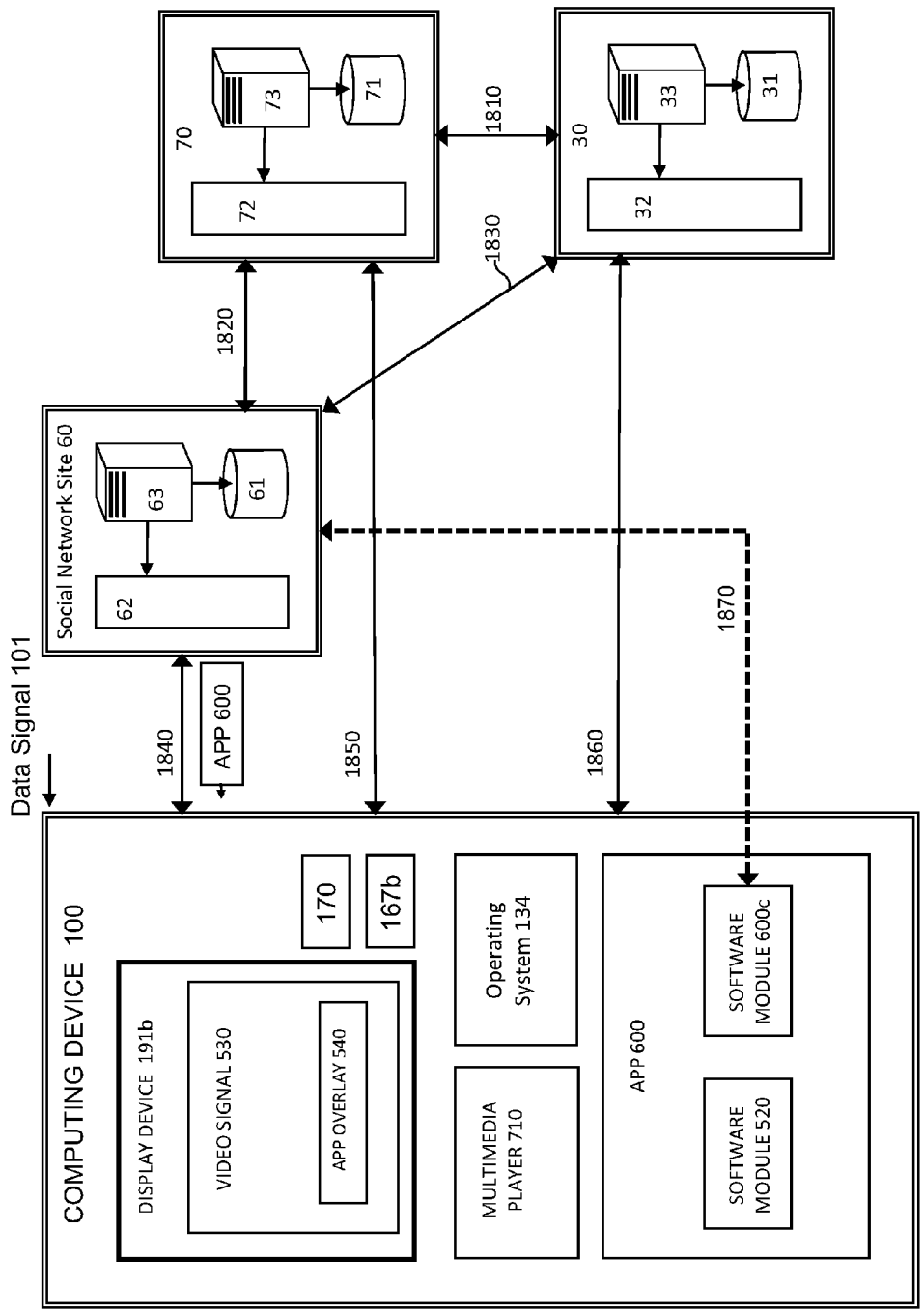
FIG. 18 illustrates a system and methods according to one or multiple implementations.

FIG. 18 illustrates an exemplary data network useable to facilitate the exchange of information between a social network 60 and one or more developer sites 30 that created application programs or APPS tailored for use with the social site 60.

In the example of FIG. 18, the data network in which the processes are executed may be the internet. In some implementations the system comprises one or more developer sites 30, one or more social sites 60, and a plurality of computing devices 100 (only one shown in FIG. 18). Upon an APP being developed for use in conjunction with the one or more social sites 60, the APP may be made available to the user of the computing devices 100 via a variety of venues. For example, the APP may be provided for a fee or free of charge from the developer site 30, a social site 60, or another site, such as an APP store, and then downloaded from any of a number of different sites.

In some implementations, a supervising site 70 is also involved. The social site 60, the developer site 30 and the supervising site 70 may execute different program applications like for example a main webpage 62, 32, 72, and a database 61, 31, 71.

According to one example a user chooses an application program APP 600 offered on the social site 60 and downloads the program APP 600 into the computing device 100 using communications 1840. APP 600 is downloaded on-line to the computing device 100 that is the equipment where the program APP 600 will be executed. In some implementations APP 600 is purchased and/or downloaded from another computing device and then installed and executed in computing device 100.

In some implementations, the computing device 100 establishes communication with the social site 60 directly through communication 1840 or indirectly via the supervising site 70 through communication 1850 and 1820.

In some implementations, the social site 60 or the supervising site 70 deal with authenticating the identity of the computing device 100 or the user of the computing device 100.

In some implementations, the social site 60 and the developer site 30 exchange information relating to the download and/or purchase of APP 600. For example, on-line communication 1830 may allow the developer site 30 to know that APP 600 has been downloaded and/or paid for from social site 60. When a purchase of APP 600 has been completed, the social site 60 may send a copy of the purchase receipt to the developer site 30 via on-line communications 1830 or through the computing device using communication 1870 or 1840 and communication 1860.

A software module may be a set of instructions integrated with, incorporated with, or otherwise designated to run with a software product to provide specific functionality. Software modules may be, for example, a component, a function or set of functions, a dynamic library, a class or set of classes, a control or class with a graphical interface, etc.

In some implementations, the APP 600 comprises two software modules: software module 520 and software module 600*c*. In other implementations the software module 520 is part of the operating system of the computing device and the APP 600 comprises the software module 600*c*.

The software modules 520, 600*c* operation may be identical or different for different software developer sites or developer companies. In some implementations, to distinguish between different developer sites 30, modifiable properties of the software modules 520, 600*c* may be modified during design time or programming time. In other implementations, modifiable properties of the software module may be modified during execution time, for example during the execution of an application program in the computing device 100 that uses or contains the software module.

In some implementations, the software modules 520, 600*c* may contain a class or a group of classes with their corresponding properties and methods, which allows by interface or integration thereof in an application, the execution of certain functionalities that are predefined in the software module.

In some implementations, the software module comprises executable instructions, for example an executable file or dynamic library, which are included or invoked from a program application, during the design time or execution time of said application, for example executing some executable instructions of the software module within the execution environment of said application.

In some implementations, the software module comprises source code that may be converted to executable instructions, for example using a compiler, a just in time compiler or an interpreter.

According to some implementations, software module incorporation refers to interfacing and/or integrating the software module in the application program in design or programming time of the application program.

In some implementations, the system is supervised by a supervising site 70 controlled by a supervising entity although the system implementations are not limited to such a configuration. Moreover, a plurality of supervising sites can be provided. The developer sites which adhere to the system request the supervising site 70 to register their sites and identify the programs which they wish to offer along with defining the condition for the sale or download thereof. The social sites and/or vendors that wish to offer on their sites the application programs request in the supervisor site to register their vendor site. A developer site and a social site and/or vendor site can agree, in the supervising site, on the conditions of the sale of a program, for example, the sale price and the allocation of sales revenue.

In some implementations, the developer may receive from the social site data to be used or included with the APP of the developer. For example data uniquely identifying each developer and each program and/or data comprising a public/private pair of cryptography keys, for example data comprising a certificate, and the developer may use the private key to sign the APP before transmitting them to the social site or directly to computer devices.

In some implementations, the social site may use the public key to verify that the application received is signed by the developer.

In some implementations, the computing device 100 may establish a communication with the social site to receive the public key and or verify that the application received is signed by the developer before installing the APP.

In still other implementations, the developer includes the public key information in the APPS, for example including the certificate, and the operating system of the computing device verifies that the application is signed by the developer.

In some implementations, the supervising site may be part of the social site 60.

In some implementations, the supervising site 70 provides the software modules 520 and/or 600c to the developer site 30 using communication 1810 so that the software module or modules may be incorporated with the application program APP 600.

The social site can obtain the programs directly from the developer site 30 or through the supervising site 70 (as the case may be).

In addition to the software modules 520 and/or 600c supplied to the developer site 30 so that they can be incorporated with their application programs, the supervising site may also provide specific applications which may be executed remotely, for example with a browser, or which may be installed in the developer sites and in the vendor sites for the purpose of implementing communications associated with the different process.

In some implementations where the user receives content with advertisement, the social site 60, the supervising site 70 and/or the developer site 30 may receive a fixed amount or a percentage of the amount paid by advertisers, for each advertisement received in the computing device 100 by means of APP 600.

Other implementations of application programs will now be explained. It is important to note however, that the present disclosure is in no way limited to the particular implementations disclosed herein.

As discussed above, the source of an application program, such as APP 600, may originate from a developer of application programs with the application programs being tailored for one or more particular functions and made available to users of computing devices who wish to exploit those functions for their own personal use. In the explanations that follow the acronym "SMA" (social media application) will be used to refer to such applications. In addition, the discussion that follows is directed primarily to tailoring advertising content to a user, but is in no way limited to advertising content.

An SMA may provide a multitude of functionalities to enable, at least in part, the multimedia content selected by a user of the computing device 100 to be modified, or otherwise tailored, for that user. As discussed above, according to at least some of the implementations disclosed herein, a social site 60, such as Facebook, may act as a source of data that is used in the selection of advertisements to be incorporated, or otherwise integrated with broadcast content that is being played, or intended to be played, in a computing device of one or more of its members.

According to some implementations, an SMA may be developed for use in conjunction with a particular social network site, such as, for example, Facebook. According to other implementations an SMA may be developed for use in conjunction with a particular social network site and one or more channel sources. For example, an SMA may be developed for Facebook that is useable in the selection of advertising content associated with broadcast content originating from one or more of the four major broadcasting companies, and their affiliates, in the United States (i.e., ABC, CBS, NBC and Fox). An SMA may also be developed for multiple social networks and one or more channel sources. SMAs may also include functionalities associated with third party advertising sources and other third party entities.

Figure 19:
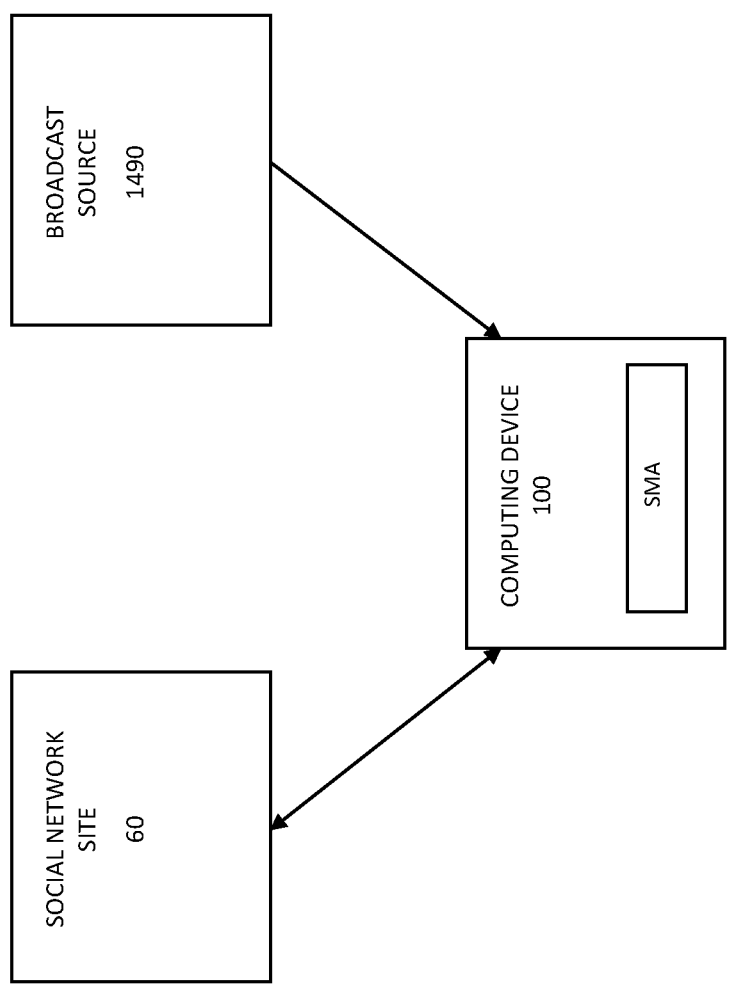
FIG. 19 illustrates a system and methods according to one or multiple implementations.

FIG. 19 illustrates an example where an SMA has been developed for use with a single social site 60 and a single broadcast source 1490. The SMA may be made available to a user of computing device 100 via one or more of the social site 60, a website of the broadcast source 1490, or a third party source, such as a website of the developer or an application store. When installed on the computing device 100, the SMA facilitates, either directly or indirectly, the exchange of data between the computing device 100 and the social site 60 and between the computing device 100 and the broadcast source 1490. In some implementations, the SMA also facilitates, either directly or indirectly, the provision of advertising content 1521a to be played in the computing device 100 in conjunction with program content from broadcast source 1490 playing, or intended to be played, in the computing device 100. The targeted advertising content 1521a may be incorporated, from the viewer's perspective, into the broadcast in a variety of ways. When the advertising 1521a is used to replace an advertisement 1512 previously incorporated into the broadcast, the SMA causes a signal process to occur in the computing device 100 that avoids the reproduction of content 1512 in the computing device 100 and reproduces the targeted advertising 1521a in its place. It is important to note, as mentioned above, that the SMA may implement the signal process directly by using its own functionalities to modify the signal processing itself, or may indirectly implement the signal processing via instructions to a signal processor resident or temporarily residing in the computing device 100.

In some instances the SMA, when executed in the computing device 100 determines if proper signal processing software and/or components compatible with the intended functionalities associated with the SMA are installed in the computing device. If upon determining, for example, that signal processing software necessary for implementing one or more of the functionalities associated with the SMA are not installed in the computing device, in some implementations the SMA, after receiving permission from the user of the computing device, automatically installs the required software. In one implementation the signal processing software is downloaded from an electronic storage medium associated with the social site 60, while in other implementations the signal processing software is downloaded from the broadcast source 1490, or a third party source. In other instances, the SMA provides one or more links useable by the user of the computing device to download the signal processing software.

In some instances a user of computing device 100 may have more than one user account with a social site 60. According to some implementations, the SMA comprises executable instructions that when executed in the computing device 100 provides the ability for the user to select which user accounts are to be used in the targeted content process. In some implementations the SMA permits a selection of all or some of the user accounts, while in other implementations the SMA only permits the selection of a single user account.

Figure 20:
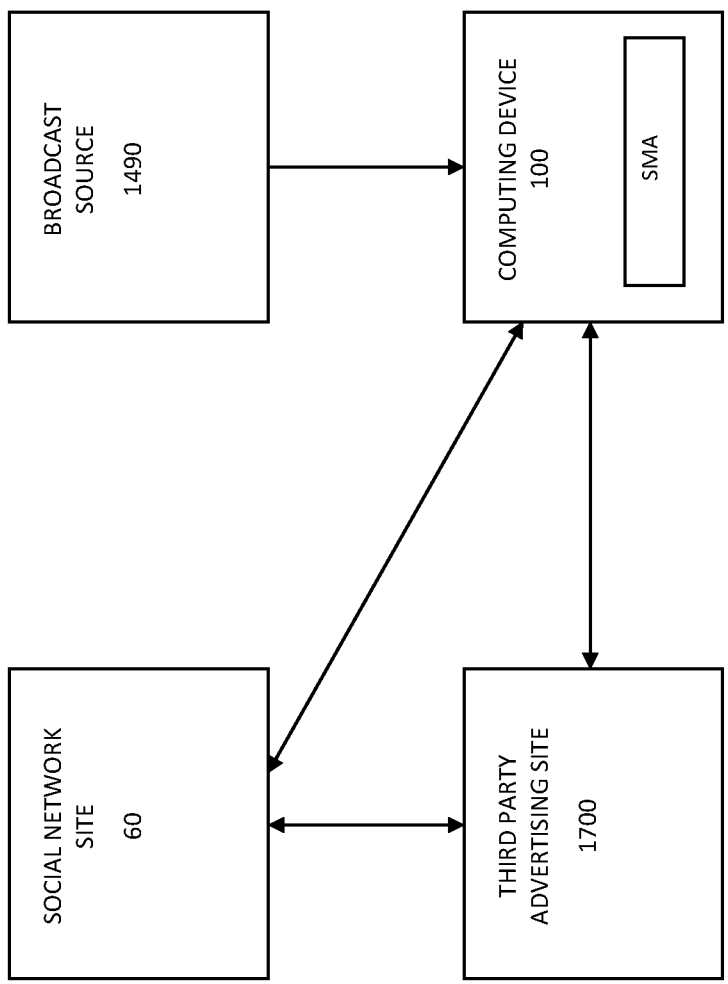
FIG. 20 illustrates a system and methods according to one or multiple implementations.

FIG. 20 shows an arrangement similar to that discussed in conjunction with FIG. 15 above wherein a third party advertising site 1700. In some implementations, as discussed above in conjunction with FIG. 15, the SMA coordinates communications and functions among the broadcast participants (e.g. computing device 100, broadcast source 1490, social site 60, third party advertising site 1700, etc.) to achieve a broadcast viewing experience for a user of the computing device 100 that includes targeted advertising or other user targeted content.

Figure 21:
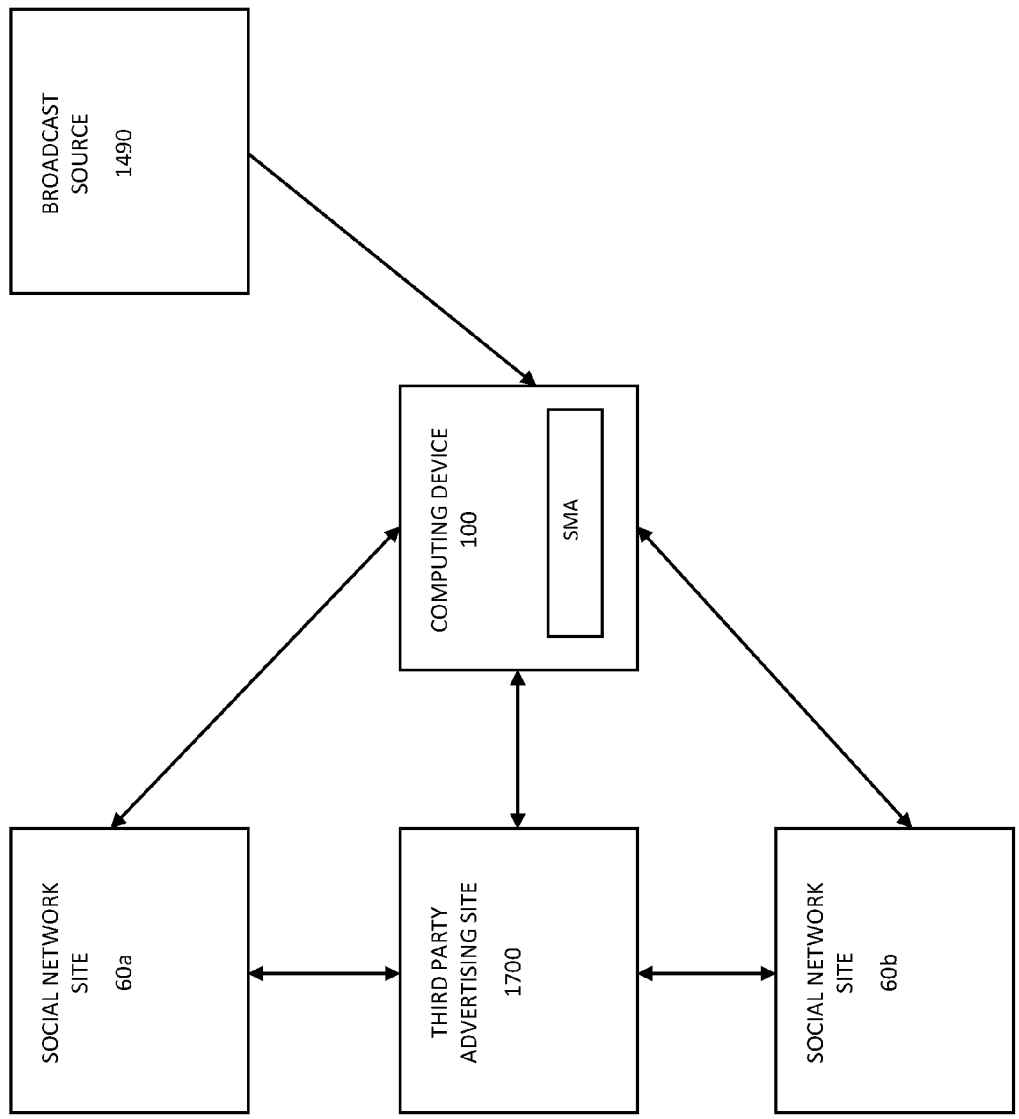
FIG. 21 illustrates a system and methods according to one or multiple implementations.

In some instances a user of a computing device is a member of multiple social network sites. According to the implementations of FIG. 21, an SMA is provided that coordinates communications and functions among broadcast participants comprising more than one social network site (e.g. social site 60a and social site 60b). According to some implementations, the SMA comprises executable instructions that when executed in the computing device 100 provides the ability for the user to select which user social sites are to be used in the targeted content process. In some implementations the SMA permits a selection of all or some of the social sites to which the user belongs, while in other implementations the SMA only permits the selection of a single social site. In situations where multiple social sites are selected, such as, for example, social sites 60a and 60b, user data from both of sites 60a and 60b are used in the selection of targeted content.

In some implementations the SMA permits the user to select a preference between social site 60a and 60b. In some implementations the SMA resolves conflicts between site 60a user data and site 60b user data using the selected preference.

In some instances the targeted advertising content is selected by the social site 60 based primarily on information contained in the profiles of one or more other members of the social site in which the user of the computing device 100 has a social relationship. For example, in one implementation the user may have a friend relationship with a member named "John" who's birthday falls on March $25^{th}$. According to some implementations, social site 60 on at least the days leading to March $25^{th}$ selects at least one or more targeted advertisements for the user of the computing based primarily on information stored with the social site relating to John. The same concept may be used for weddings, valentine's day, father's day, mother's day, etc. In some implementations the social site 60 selects the targeted advertising based on general member information, while in other implementations the social site 60 facilitates the creation of a gift preference list by its members and uses information from these lists in the advertising selection process.

In some implementations the social site 60 provides an advertising listing that is segmented by product categories, lifestyle attributes, event type (e.g. birthday, wedding, etc.), etc. By use of the listing/database, the social site permits a member, like John, to select from the advertising list/database one or more advertisements he/she would like to be sent to other members to be played in conjunction with broadcast content that is being viewed or is to be viewed in the computing device 100 of the other social site member.

According to some implementations the social site 60 causes to be transmitted to the user computing device a reminder, such as in the form of text, that may be delivered and reproduced in the computing device at a time coincident, or at a moment near in time to when the targeted advertisement is being reproduced in the computing device.

According to some implementations, the user of the computing device may activate and/or deactivate such functionalities by use of the application 600 residing in the computing device or by other means provided by the social site.

According to some implementations the social site 60 provides to John, and of course other members like John, any ability to activate and/or deactivate this type of advertising selection as it relates to them personally.

Turning again to FIG. 14, in other implementations the social network site 60 transmits content to the TV site 1490 for the purpose of being broadcast to multiple end-user media devices, such as computing devices 100a, 100b and 100c. In some implementations the content to be broadcast is delivered to the TV site 1490 via the network 1300 through communications 1440 and 1450, while in other implementations the broadcast content is delivered to the TV site via communication 1495. Although FIG. 14 depicts a single social network site 60, a single TV site 1490 and a single network 1300, it is to be appreciated that implementations involving two or more social network sites, two or more TV sites and two or more networks are contemplated. For example, content received in the TV site 1490 to be broadcast may originate from multiple social network sites. Another example may involve the social network site transmitting content for broadcast to multiple TV sites.

In the example of FIG. 14, the TV site 1490 is shown as being distinct from the social network site 60. However, according to some implementations the functions and equipment associated with the TV site 1490 are integrated with those of the social network site 60 to form a social broadcasting site (herein after referred to as an "SBS") having functionalities associated with both the social network site 60 and TV site 1490. An SBS advantageously provides a single platform for hosting and broadcasting social content.

The broadcast content transmitted from the social network site 60 may reside in one or more data storage devices associated with the social network site. The broadcast content may comprise content uploaded to the social network site by member users of the site, content originating in the social network site and content deposited into the social network site by custodians/administrators of the site. The content transmitted from the social network site 60 to the TV site 1490 may have as its source any one or more of the foregoing types of content.

In some implementations content is selected for broadcast by use of information residing in the social network site 60 associated with one or more members of the social network site. The member information may comprise member profile information and/or member preference information. Member profile information may include, for example the gender, age or geographic location of the member, Member preference information may include, for example, information related to member hobbies, topics of interest, survey results, or any other information indicative of a member's interest. In one implementation content selected to be broadcast to a specific geographic location is done by providing to members in the geographic location with an ability voice their preference to candidate content. In one implementation a descriptive listing and/or audio clips and/or video clips and or video/audio clips of candidate content is made available to the members along with means to express a member's preference of content to be broadcast.

In other implementations content to be broadcast is selected solely, or in part, by information of member's that are logged in with the social network site and/or tuned in to a broadcast channel of the TV site. For example, computing devices 100a and 100b may be receiving via a broadcast receiver data signals associated with a sports channel of the TV site while computing device 100c may be receiving via a broadcast receiver data signals associated with a movie channel. By use of, for example, the application program 600 stored in the computing devices, real-time channel viewing data associated with each of the computing devices 100a, 100b and 100c are transmitted to the social network site 60. Subsequent to receiving the channel viewing data form computing devices 100a and 100b, the social network site 60 may access member information of the users of computing devices 100a and 100b and use the member information to select the next or future content of the sports channel broadcast. If, for example, member information of a large portion of the sports channel viewing audience indicates a preference for the game of tennis, the social network site 60 may select content related to the game of tennis to be the next or future content of the sports channel. In a like manner, the social network site 60 may access member information of the user of computing device 100c and use the member information to select the next or future content of the movie channel broadcast.

According to some implementations, upon the social network site 60 selecting content to be broadcast subsequently makes available information about the future broadcast content, along with viewing details (e.g., broadcast channel, date, time, etc.) to one or more of the users of computing devices 100a, 100b and 100c. In some implementations information about the future broadcast content is made available to the one or more computing devices 100a, 100b and 100c by transmitting the information via the TV site so that it is broadcast to the one or more computing devices. In some implementations in lieu of or in conjunction with broadcasting the information, the information about the future broadcast content is multicast or unicast to the one or more computing devices via network 1300.

In one implementation the social network site 60 transmits, or otherwise provides to the TV site 1490 one or more streams of data comprising broadcast content. In some implementations the one or more streams are transmitted, periodically, continuously, or nearly continuously. In this manner, the TV site 1490 may periodically, continuously, or nearly continuously, be provided with content form the social network site from which it may select content for being incorporated into a program for broadcast. For example, the social network site 60 may facilitate receiving from members of the site content related to humorous events in the form of audio/video clips.

In one implementation the social network site 60 makes available through its website, or another website, an application program specific to downloading from a user computing device content related to humorous events. For example, it may be that the Fox Network broadcasts a program entitled "Funny Moments". An application program specific to "Funny Moments" may be made available for download from the social network site 60 and/or the Fox Network website to the computing devices 100a, 100b and 100c. The application may comprise executable instructions that when executed in a computing device launches an interactive display to assist the user of the computing device to download to a storage medium associated with the social network site 60 video/audio clips specifically designated as candidate content for the program "Funny Moments". In some implementations the application program provides editorial tools useful for formatting the content according to specifications or other requirements imposed by the social network site 60 and/or TV site 1490 (e.g., the Fox Network). The editorial tools may comprise, for example, compression tools or other means to diminish or increase the byte size of the audio/video clip. The tools may also comprise means for adjusting sound quality, video quality, splicing content, omitting content, adding content (e.g., sound effects, voice-over, text, etc.). In this manner, content downloaded to the social network site 60 may be provided in a format ready or nearly ready for incorporation into the program "Funny Moments". In some implementations, the application program does not itself provide the editorial functions, but instead launches or makes available for download to the user's computing device one or more of the editorial tools.

As discussed above, in some instances the functions of the TV site are incorporated with the social network site so that the social site itself is the broadcasting entity. In such instances the broadcast may occur via a transmission through network 1480 and antennas 1411, 1412 and 1413 or via a multicast through network 1300.

In addition to providing content to be broadcast in, for example, the program "Funny Moments", the social network site may also provide one or more other streams of data to the TV site (e.g. the Fox Network) and/or other TV sites (e.g. ABC, CBS, NBC, etc.) for being included in other broadcast programs. For example, the Fox Network may broadcast a program entitled "My Wedding" that is designated to at least partially include video/audio clips from real-life weddings. According to one implementation the social network site supports the download and prepares wedding video content for broadcast in a manner like that described above.

As discussed above, in some instances broadcast content transmitted to the computing devices 100a, 100b and 100c from the TV site 1490 may be augmented or otherwise supplemented with non-broadcast content that is provided via a unicast communication between the social network site 60 and the computing devices 101a, 101b and 101c. As previously discussed, the unicast-provided content may be, for example, advertising content. In implementations involving the social network site 60 directly broadcasting or indirectly broadcasting through a third party or external TV site, advertisements or other types of content may be transmitted from the social network site 60 to the computing devices via a unicast communication for the purposed of being incorporated, or integrated or otherwise played in conjunction with the broadcast content. The unicast transmitted content may be selected in accordance with one or more of implementations previously disclosed herein. In one implementation the computing devices comprise the requisite hardware, firmware and/or software for receiving and processing the broadcast data signals 101 and also the requisite hardware, firmware and/or software for receiving and processing the unicast data from the social network site.

According to one implementation a method is provided that comprises transmitting from a social network site to a television broadcasting site a stream of data comprising broadcast content, the broadcast content designated by the social network site to be broadcast by the television broadcasting site to a plurality of end-user media devices, the end-users being members of the social network site; receiving in the social network site from an end-user media device that is receiving or designated to receive the broadcast content broadcast data related to the broadcast content and identifying data of the member end-user; accessing in the social network site member information of the end-user; and selecting in the social network site by use of the broadcast data and the member information targeted advertising content for the purpose of facilitating a transmission of the targeted advertising content to the end-user media device for it to be played in conjunction with the broadcast content.

Note that in the foregoing description, references to "one implementation" or "an implementation", "in some implementations", or like terms mean that the feature or features being referred to is included in at least one implementation of the present invention. Further, separate references to "one implementation" or "an implementation", "in some implementations", or like terms" in the foregoing description do not necessarily refer to the same implementation; however, such implementations are also not mutually exclusive unless so stated, and except as will be readily apparent to those skilled in the art from the description. For example, a feature, structure, act, etc. described in one implementation may also be included in other implementations. Thus, the present invention includes a variety of combinations and/or integrations of the implementations described herein.

What is claimed is:

1. A method comprising:
   transmitting from a social network site to a television broadcasting site a stream of data comprising broadcast content, the broadcast content designated by the social network site to be broadcast by the television broadcasting site to a plurality of end-user media devices, each associated with a respective member of the social network site;
   receiving in the social network site from an end-user media device among the plurality of the end-user media devices identifying data of a respective associated member and broadcast data designated to be broadcast by the television broadcasting site in association with the broadcast content;
   obtaining in the social network site information related to the respective associated member; and
   selecting in the social network site, by use of the broadcast data and the obtained information, targeted advertising content, the content designated for transmission to the end-user media device for it to be played in conjunction with the broadcast content.

2. A method according to claim 1, further comprising transmitting from the social network site the targeted advertising content to the end-user media device.

3. A method according to claim 1, further comprising transmitting from the social network site an application program to the end-user media device, the application program comprising executable instructions that when executed in the end-user media device coordinates the exchange of data between the end-user media device and the social network site.

4. A method according to claim 1, wherein the television broadcast site is a part of the social network site.

5. A method according to claim 1, further comprising transmitting from the social network site information about the selected targeted advertising content to a third party advertising site for the purpose of having the third party advertising site transmit the selected targeted advertising content to the end-user media device.

6. A method according to claim 1, wherein the broadcast data comprises identifying data of an advertising source, the selected targeted advertising content having as its source the advertising source.

7. A method according to claim 1, wherein the targeted advertising content is selected from a database stored in the social network site.

8. A method according to claim 7, wherein the social network site periodically receives electronic updates to the database from a third party advertising site.

9. A method according to claim 1, further comprising the social network site sending an instruction or set of instructions to the third party advertising site to transmit to the end-user media device the targeted advertising content from the third party advertising site.

10. A method according to claim 1, further comprising the social network site storing information about the selected targeted advertising content in a memory location associated with the member.

11. A method according to claim 10, further comprising the social network site using the stored information about the selected targeted advertising content in the selection of subsequent targeted advertising content for the member.

12. A method according to claim 1, further comprising receiving in the social network site an application program via the internet from an application developer site, the application program comprising executable instructions that when executed in the end-user media device coordinates the exchange of data between the end-user media device and the social network site.

13. A method according to claim 1, wherein the member information comprises social relationship information related to other members of the social network site.

14. A method according to claim 1, wherein the member information comprises advertising preference information.

15. A method according to claim 12, wherein the application program comprises executable instructions that when executed in the end-user media device are useable to edit the broadcast content.

* * * * *